US008024344B2

(12) United States Patent
Bradford

(10) Patent No.: US 8,024,344 B2
(45) Date of Patent: Sep. 20, 2011

(54) VECTOR SPACE METHOD FOR SECURE INFORMATION SHARING

(75) Inventor: Roger Bradford, Great Falls, VA (US)

(73) Assignee: Content Analyst Company, LLC, Reston, VA (US)

(*) Notice: Subject to any disclaimer, the term of this patent is extended or adjusted under 35 U.S.C. 154(b) by 553 days.

(21) Appl. No.: 12/133,991

(22) Filed: Jun. 5, 2008

(65) Prior Publication Data

US 2009/0328226 A1  Dec. 31, 2009

Related U.S. Application Data

(62) Division of application No. 10/337,426, filed on Jan. 7, 2003, now abandoned.

(51) Int. Cl.
*G06F 7/00* (2006.01)
*G06F 17/30* (2006.01)

(52) U.S. Cl. ........ 707/739; 707/741; 707/750; 715/256; 715/708; 715/751

(58) Field of Classification Search .................. 707/739, 707/741, 750; 715/256, 708, 751
See application file for complete search history.

(56) References Cited

U.S. PATENT DOCUMENTS

| | | | |
|---|---|---|---|
| 5,054,066 A * | 10/1991 | Riek et al. ..................... | 713/170 |
| 5,619,709 A | 4/1997 | Caid | |
| 5,675,710 A | 10/1997 | Lewis | |
| 5,675,819 A | 10/1997 | Schuetze | |
| 5,778,362 A | 7/1998 | Deerwester | |
| 5,991,709 A | 11/1999 | Schoen | |
| 6,182,063 B1 * | 1/2001 | Woods ......................... | 707/722 |
| 6,289,353 B1 | 9/2001 | Hazelhurst et al. | |
| 6,324,646 B1 * | 11/2001 | Chen et al. ............. | 707/999.103 |
| 6,332,138 B1 | 12/2001 | Hull et al. | |
| 6,510,406 B1 | 1/2003 | Marchiso | |
| 6,523,026 B1 | 2/2003 | Gillis | |
| 6,542,889 B1 | 4/2003 | Aggarwal et al. | |
| 6,556,982 B1 | 4/2003 | McGaffey et al. | |

(Continued)

OTHER PUBLICATIONS

Hanani et al.—"Information Filtering Overview of Issues, Research and Systems"—User Modeling and User-Adapted Interaction, vol. 11, No. 1 2001, Kluwer Academic Publisher, (pp. 203-259).*
Martin et al.—"Multisender Authentication Systems with Unconditional Security"—INformation and Communications Security, 1997, vol. 1334/1997, Springlink 1997, (pp. 130-143:1-14).*
Deerwester, S., et al., "Indexing by Latent Semantic Analysis," Journal of the American Society for Information Science, 41(6), pp. 391-407, Oct. 1990.

(Continued)

*Primary Examiner* — John E Breene
*Assistant Examiner* — Anh Ly
(74) *Attorney, Agent, or Firm* — Sterne, Kessler, Goldstein & Fox P.L.L.C

(57) ABSTRACT

Presented are systems and methods for securely sharing confidential information. In such a method, term vectors corresponding to ones of a plurality of confidential terms included in a plurality of confidential documents is received. Each of the received term vectors is mapped into a vector space. Non-confidential documents are mapped into the vector space to generate a document vector corresponding to each non-confidential document, wherein the generation of each document vector is based on a subset of the received term vectors. At least one of the non-confidential documents is identified in response to a query mapped into the vector space.

8 Claims, 13 Drawing Sheets

U.S. PATENT DOCUMENTS

| | | | |
|---|---|---|---|
| 6,678,679 B1 | 1/2004 | Bradford | |
| 6,728,695 B1 | 4/2004 | Pathria et al. | |
| 6,775,677 B1 | 8/2004 | Ando et al. | |
| 6,847,966 B1 * | 1/2005 | Sommer et al. | 707/739 |
| 6,862,710 B1 | 3/2005 | Marchiso | |
| 6,917,952 B1 | 7/2005 | Dailey et al. | |
| 6,954,750 B2 | 10/2005 | Bradford | |
| 7,313,825 B2 * | 12/2007 | Redlich et al. | 715/751 |
| 7,580,910 B2 * | 8/2009 | Price | 706/46 |
| 2002/0026456 A1 | 2/2002 | Bradford | |
| 2002/0091734 A1 | 7/2002 | Redlich et al. | |
| 2002/0103799 A1 | 8/2002 | Bradford et al. | |
| 2002/0138528 A1 * | 9/2002 | Gong et al. | 707/530 |
| 2002/0143827 A1 * | 10/2002 | Crandall | 707/530 |
| 2002/0151992 A1 * | 10/2002 | Hoffberg et al. | 700/83 |
| 2003/0018617 A1 | 1/2003 | Schwedes | |
| 2003/0033284 A1 | 2/2003 | Warren et al. | |
| 2003/0033287 A1 * | 2/2003 | Shanahan et al. | 707/3 |
| 2003/0037073 A1 * | 2/2003 | Tokuda et al. | 707/500 |
| 2003/0101181 A1 | 5/2003 | Al-Kofahi et al. | |
| 2003/0212673 A1 * | 11/2003 | Kadayam et al. | 707/3 |
| 2003/0217047 A1 * | 11/2003 | Marchisio | 707/3 |
| 2003/0236845 A1 | 12/2003 | Pitsos | |
| 2004/0039657 A1 * | 2/2004 | Behrens et al. | 705/26 |
| 2004/0083211 A1 | 4/2004 | Bradford | |
| 2004/0085354 A1 | 5/2004 | Massand | |
| 2004/0090472 A1 | 5/2004 | Risch et al. | |
| 2004/0205457 A1 | 10/2004 | Bent et al. | |
| 2004/0205461 A1 | 10/2004 | Kaufman et al. | |
| 2005/0021517 A1 | 1/2005 | Marchisio | |
| 2005/0022114 A1 | 1/2005 | Shanahan et al. | |
| 2005/0182765 A1 * | 8/2005 | Liddy | 707/5 |
| 2006/0117052 A1 | 6/2006 | Bradford | |
| 2006/0212413 A1 | 9/2006 | Rujan et al. | |
| 2009/0328226 A1 * | 12/2009 | Bradford | 707/102 |

OTHER PUBLICATIONS

Ding, C., A Similarity-based Probability Model for Latent Semantic Indexing, Proceedings of the 22nd Annual SIGIR Conference, Berkeley, Calif., Aug. 1999.

Hoffman, T., "Probabilistic Latent Semantic Indexing," Proceedings of the 22nd Annual SIGIR Conference, Berkeley, CA, 1999, pp. 50-57.

Marchisio, G., and Liang, J., "Experiments in Trilingual Cross-language Information Retrieval," Proceedings, 2001 Symposium on Document Image Understanding Technology, Columbia, MD, 2001, pp. 169-178.

Dumais, S., et al., "Automatic Cross-Language Retrieval Using Latent Semantic Indexing", in SIGIR '96-Workshop on Cross-Linguistic Information Retrieval, pp. 16-23, Aug. 1996.

S. Schneier, "Applied Cryptography," $2^{nd}$ Edition, John Wiley and Sons, 6pgs. 1996.

Kohonen, T. "Self-Organizing Maps," Third Edition, Springer-Verlag Berlin Heidelberg, New York, pp. 105-115 and 191-194.

Dumais, S.T., "Latent Semantic Indexing (LSI): TREC-3 Report" in D. Harman (Ed.), Overview of the Third Text Retrieval Conference (TREC3) National Institute of Standards and Technology Special Publication (1995), pp. 219-230.

* cited by examiner

Figure 2A
Prior Art

Occurrence of Terms in Document

| Terms | Document 1 | Document 2 | ... | Document N |
|---|---|---|---|---|
| Able | 1 | 0 | ... | 1 |
| Acid | 0 | 2 | ... | 0 |
| ... | ... | ... | ... | ... |
| Zircon | 1 | 0 | ... | 1 |

Documents

Figure 2B
Prior Art

| Term v. Document Matrix | | | |
|---|---|---|---|
| Able | 1 | 2 | ... |
| Acid | 1 | 0 | ... |
| ... | 0 | 2 | ... |
| ... | ... | ... | ... |

=

| Term Matrix |
|---|
| Able |
| Acid |
| ... |

×

| Singular Matrix | | |
|---|---|---|
| 1 | 0 | 0 |
| 0 | 2 | 0 |
| 1 | 0 | 0 |
| ... | ... | ... |

×

| Document Matrix |
|---|
| 1 |
| 2 |
| ... |

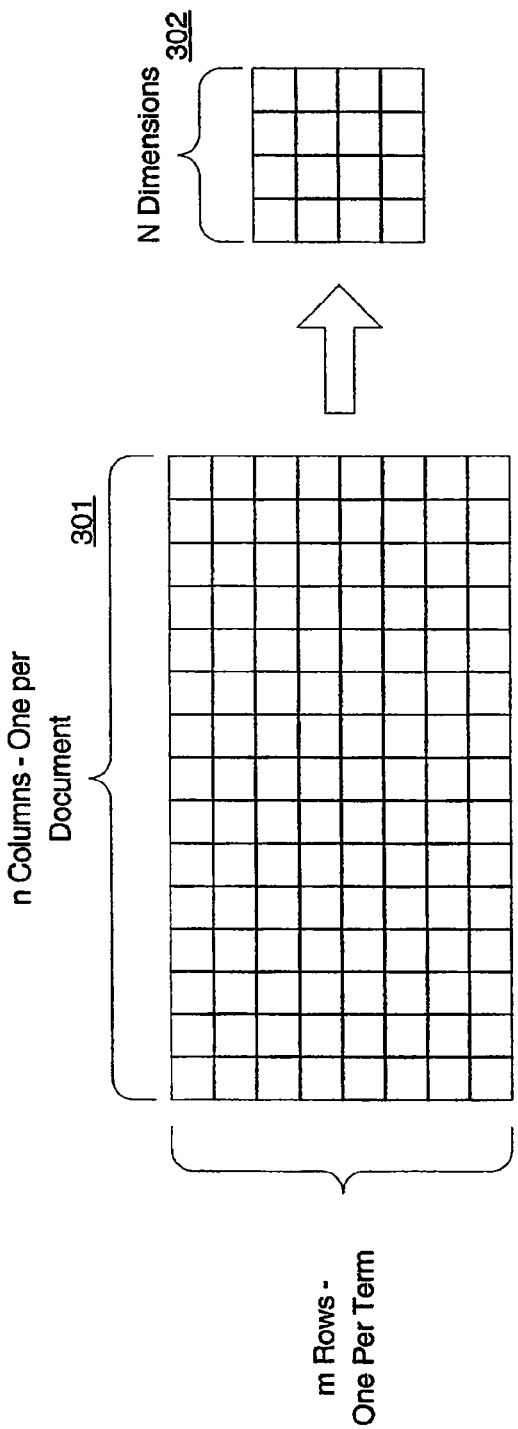
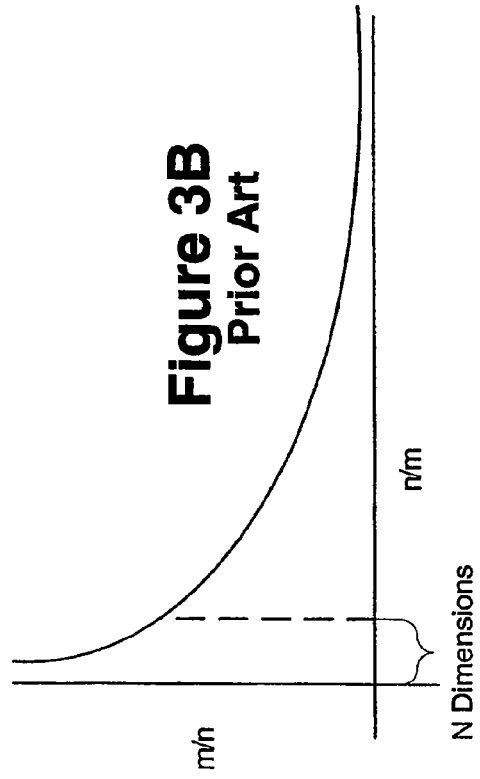
Figure 3A
Prior Art
Figure 3B
Prior Art

VECTOR SPACE METHOD FOR SECURE INFORMATION SHARING

CROSS REFERENCE TO RELATED APPLICATIONS

This application is a divisional of U.S. patent application No. 10/337,426 to Roger Bradford, entitled "Vector Space Method for Secure Information Sharing" and filed Jan. 7, 2003, now abandoned, the entirety of which is incorporated by reference herein.

BACKGROUND OF THE INVENTION

1. Field of the Invention

Aspects of the present invention are directed to sharing information. More particularly, aspects of the present invention are directed to sharing information content without revealing the source of the information.

2. Background Art

In a growing number of situations, security is becoming an issue with information sharing. One may want to share information about a topic but not reveal the source of the information. For instance, an individual in a government agency may have a confidential document that contains information relevant to an inquiry made by another at a different government agency. Because of security concerns (including revealing the document or its source), the individual with the document is prevented from sharing this information with the other individual even though the other individual may have a clear need for the information.

Existing approaches to sharing information may be grouped into two classes: "system high access" security approaches and multi-level approaches. In "system high access" approaches, all users have access to all information. This approach has the virtues of simplicity and maximal access to information. However, it is relatively poor from the standpoint of the security of the information.

In multi-level security approaches, information of interest is divided" into compartments. Individual users have access only to specific compartments. Compartmenting information through multi-level security has several drawbacks. Fundamentally, a problem exists of having to implement a computer system that can be trusted to genuinely provide multi-level security. The complexity of modern operating systems makes such an implementation a difficult task. Even if that problem is solved, the multi-level security approach has many of the same problems as the "system high" approach. If few users have access to multiple compartments, the degree of information sharing is minimized. This approach significantly enhances security, but at a cost of much more limited use of the information. However, if many users have access to multiple compartments, security is compromised. In the limit, as many users have access to many compartments, the multi-level security approach resembles a "system high" implementation.

Queries made by an individual for information may be in electronic form. This may be due to the large volume of information to be parsed or because of the anonymity electronic searching can provide. Adding to the difficulties of electronic searching are the differences between organizations that provide information. These organizations may use different terminologies, different methods of organizing data, and have different priorities in their indexing systems. Further, language issues may arise as well as name variations, transliteration differences, nicknames, and aliases. Finally, one entity may relate two concepts while another may not.

The combination of these factors lead to greater hurdles in attempting to exchange information between organizations. One text has referenced multiple users working together to share limited bits of information, one at a time. To implement this approach, one would need to distribute all information from all users to all other users, which would be a significant load for multiple users with large amounts of data (Schreier, B., Applied Cryptography, 2nd Edition, John Wiley and Sons, 1996, p. 529. ).

An approach is needed that permits electronic searching for information while providing a strong level of security for participants.

BRIEF SUMMARY OF THE INVENTION

Aspects of the present invention provide solutions to at least one of the issues mentioned above, thereby enabling one to share information securely without revealing the underlying source of the information. Latent semantic indexing of information provides a process for handling textual material and associating the material based on conceptual context of the text. Latent semantic indexing may use vector representations of documents and/or terms in the documents and store these representations in a centralized storage. Entities may then perform searches on the stored vectors to determine if documents exist that are relevant to their query. If the documents are not available to the searching entity, then access to the documents may be requested. Alternatively, some documents may be obtained without permission, yet ordered on the relationship these documents have with terms from the non-accessible documents. Further, entities may upload their own vectors of documents and/or terms to enhance the information stored in said centralized storage.

These and other aspects of the present invention will become known through the following drawings and associated description.

BRIEF DESCRIPTION OF THE DRAWINGS/FIGURES

The foregoing summary of some of-the aspects of the invention, as well as the following detailed description of the various embodiments, is better understood when read in conjunction with the accompanying drawings, which are included by way of example, and not by way of limitation with regard to the claimed invention.

FIGS. 2A and 2B show a matrix and decomposition of the matrix.

FIGS. 3A and 3B show reducing the number of dimensions of a matrix.

DETAILED DESCRIPTION OF THE INVENTION

Figure 1:
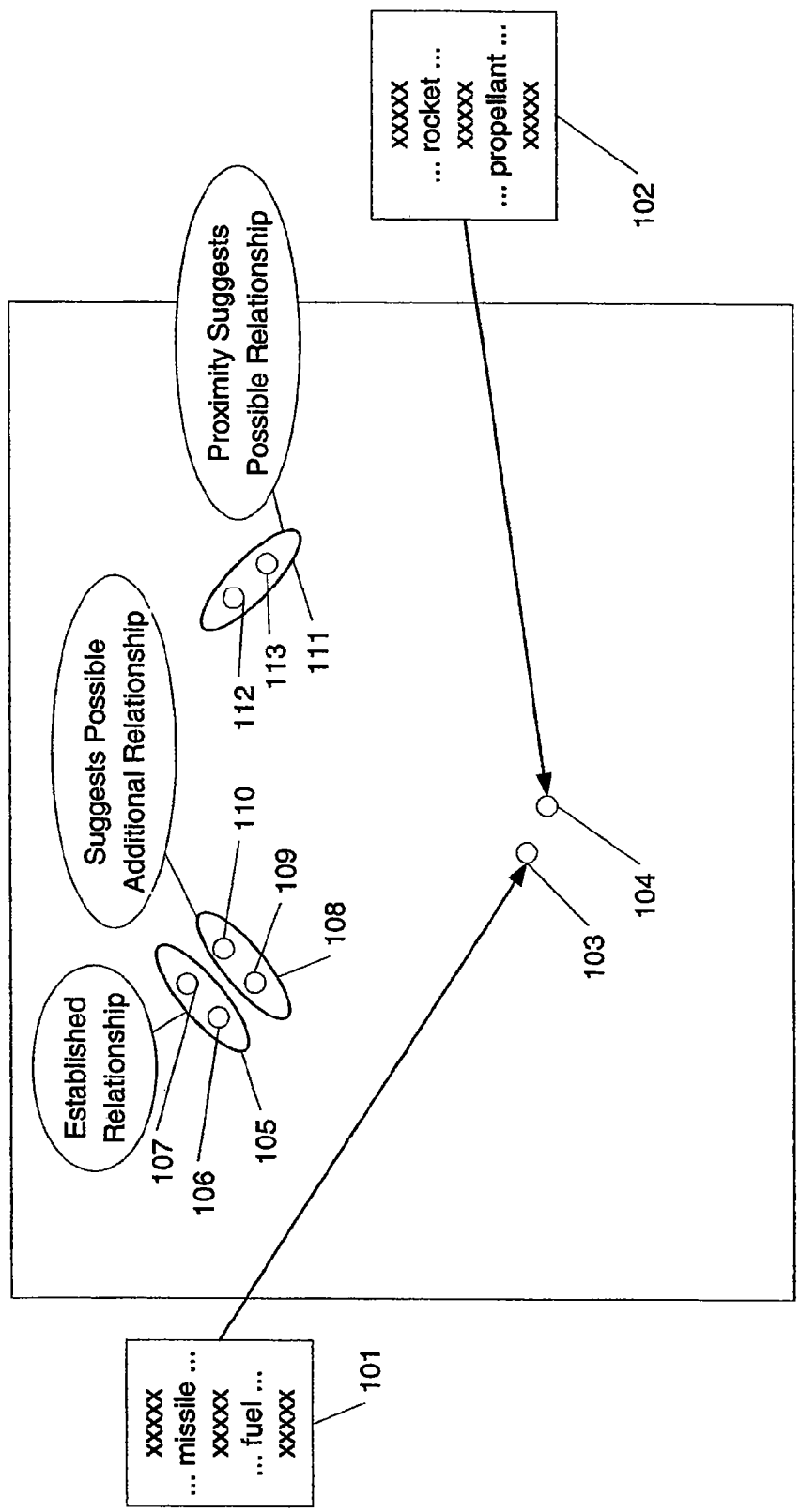
FIG. 1 shows conventional latent semantic indexing space with two documents.

Aspects of the present invention relate to latent semantic indexing of information as applied to secure information sharing. Information may be provided as a point in a vector space. Advantages of various aspects of the present invention include determining relationships between terms and documents independent of subject matter, terminology, and language. In a growing number of situations, it is desirable to be able to share knowledge in a given subject area, without having to release the details of the individual information sources that collectively generate that body of knowledge. It is also desirable to enable analytic operations to be performed to make use of the overall information content of the body of knowledge, without having to reveal the details of the individual sources.

The following is arranged into a number of subsections to assist the reader in understanding the various aspects of the invention. The subsections include: terms; conventional vector space representations; secure information exchange; and applications.

Terms

Information item—An item of data to which a conceptual context may be attributed. The information items may include maps including text associated with maps, chemical formulas, textual documents, character strings, audio files, arbitrary character strings (such as acronyms, numbers, chemical formulas, protein sequences), and the like. Moreover, the granularity of indexing can be chosen to match the application. Textual documents, for example, may be indexed at the level of sentences, paragraphs, pages, chapters, or other expedient subdivisions. For simplicity, however, information items will be referred to herein as documents and character strings will be referred to as terms or words. In most cases, however, the information items are textual documents with logical collections of character strings, which comprise words and/or numbers. It is noted, however, that other information items may be substituted when using the term "document."

Term—an identifiable element in an information item.

Vector Space—a conceptual construct in which documents and/or terms may be placed relative to other documents and/or terms, where the relative placement is determined by distance to other documents and/or terms. Vector representations of documents and terms may include absolute vector representations (using an underlying coordinate system), relative vector representations (how the vectors compare to other term and/or document vectors), or a combination of both.

Conventional Vector Space Representations

The following describes latent semantic indexing. In the following section, Latent Semantic Indexing is applied to secure information sharing. The concept of latent semantic indexing is known (see, Deerwester, S., et al., Indexing by Latent Semantic Analysis, Journal of the Society for Information Science, 41(6), pp. 391-407, October, 1990 and Computer Information Retrieval Using Latent Semantic Structure, U.S. Pat. No. 4,839,853, Jun. 13, 1989, each of whose contents are expressly incorporated by reference for any essential subject matter).

To obtain the benefit of the concepts and relationships accessible through the body of knowledge, all documents are reduced to a point in vector space. One or more terms of the document may be represented as vectors describing the conceptual content of the document without providing the underlying document. For example, the following sentence, "Federal regulators have begun considering rules that would allow drones, the pilotless planes being used in the war in Afghanistan, to fly in U.S. airspace . . . "

includes the following terms: federal, regulators, considering, rules, allow, drones, pilotless, planes, war, Afghanistan, fly, U.S., and airspace. The document may be represented as a point in vector space and have the terms represented as points in vector space, whose relative position in vector space relates to the relevance the terms have to the document. More documents may be parsed and the term vectors combined to represent a richer, conceptual representation of the terms. In this process, latent semantic indexing provides an abstract representation of the conceptual content of information items of interest.

The abstract representation of the document may include the following three properties:

The representation should accurately capture the conceptual content of the documents;

The representation should support analytic operations of interest (such as information retrieval, categorization, clustering, etc.); and, The documents should be secure in that one should not be able to work backwards from the representation to reconstruct the internals of the individual information sources (documents), whether or not they are sensitive documents.

The above may be met through the use of high-dimensional vector space. In general, the ability to represent the conceptual content of documents in a high-dimensional vector space is known (see Deerwester). One algorithm for enhancing security regarding information sharing is the technique of latent semantic indexing.

Also, information of interest may be represented as a point in an M-dimensional vector space. Multiple parties each are given knowledge of some hyperplane within this space. In order to recover the information point, some number of these parties share their hyperplane information. The information point of interest is given by the intersection of these hyperplanes. By expanding the region about the information point, one may obtain related information that is conceptually similar or is in other ways related to the information point. (See Schneier, B., Applied Cryptography, 2nd Edition, John Wiley and Sons, 1996, p. 529. ).

The following provides a list of items that a vector space representation achieves at least in part:

The vector representations of documents accurately capture the conceptual content of those documents;

Terms and/or documents should be represented as vectors in the space in such a manner that useful analytic operations may be carried out on these vectors;

If documents are represented in the space, it should not be possible to work backwards from the vectors for the documents to reconstruct the internals of any of the original information items (e.g., source documents);

If terms are represented in the space, it should not be possible to work backwards from these term vectors to reconstruct the internal details of any of the original information items; and, If both documents and terms are represented in the space, it should not be possible to work backwards from any combination of these vectors to reconstruct the internal details of any of the original information items.

In addition to these points, the following characteristics of the vector space are desirable, both individually and collectively (yet are optional):

The vector space employed should constitute a significant dimensionality reduction in comparison to a simple vector space where every document being dealt with (or every term in those documents) corresponds to a dimension. The vector representation may relate to an underlying coordinate system or may relate to a relative representation of how the terms and documents relate;

It should be possible to represent both terms and documents in the same space;

The vectors corresponding to given terms should reflect aggregate relationships among those terms as determined by the contexts in which they occur in the source information items; and, There should be a metric defined in the space that allows comparison of objects (term and/or document vectors) based on their conceptual similarity.

Latent semantic indexing (LSI) satisfies the above points. (See Deerwester and U.S. Pat. No. 4,839,853). Moreover, from a broad information retrieval perspective, LSI provides a beneficial semantic subspace based on maximum likelihood estimation (see Ding, C., A Similarity-based Probability Model for Latent Semantic Indexing, Proceedings of the 22nd Annual SIGIR Conference, Berkeley, Calif., August, 1999, pp. 58-65, whose contents are expressly incorporated herein by reference for any essential subject matter).

While the invention as detailed below is described with respect to LSI, alternative techniques may be used to achieve similar results using the description found herein. For example, probabilistic latent semantic indexing (see Hoffman, T., Probabilistic Latent Semantic Indexing, Proceedings of the 22nd Annual SIGIR Conference, Berkeley, Calif., 1999, pp. 50-57), self-organizing maps (Kohonen, T., Self Organizing Maps, 3rd Edition, Springer-Verlag, Berlin, 2001), and latent semantic regression (Marchisio, G., and Liang, J., Experiments in Trilingual Cross-language Information Retrieval, Proceedings, 2001 Symposium on Document Image Understanding Technology, Columbia, Md., 2001, pp. 169-178) may all be used to generate spaces that may be used with the techniques of the present invention (each of which is expressly incorporated herein by reference for any essential subject matter).

The following provides an example of LSI. A user enters a query "war crimes". The system using LSI may retrieve a document containing the following phrase "methods of armed struggle not accepted internationally." Notably, while the found phrase did not contain either of the terms "war" or "crimes", a document was found that related conceptually to the query terms.

As to LSI in general, FIG. 1 shows a graphical example of conceptual relationships between terms. Document 101 has been parsed and has been found to contain the terms "missile" and "fuel." The point representation of document 101 is found at point 103. Document 102 is found to contain the terms "rocket" and "propellant." The point representation of this document is found at position 104. The proximity of the two documents shows that they are related at least at a conceptual level. Documents 106 and 107 have previously been defined as being related. This fact is supplemented in that they are near each other (with the relationship shown by loop 105). Similarly, the documents at points 109 and 110 are close to one another. The proximity of the two points suggests a possible additional relationship. Further, points 112 and 113 are close to each other, thereby suggesting yet another relationship as shown by loop 111.

The LSI technique provides an automated method for extracting the semantic information that is latent in a collection of text. The LSI technique starts with a collection of text passages, typically referred to as documents. A large, sparse matrix is formed, where each row corresponds to a term that appears in the documents of interest, and each column corresponds to a document as shown in FIG. 2A.

In the simplest implementation, each value (m,n) in the matrix corresponds to the number of times that the word m occurs in document n. Various weighting techniques may optionally be applied to advantage at this point based on a variety of factors including proximity, relevance of the document, age of the document, significance of the term, and the like. The technique of singular value decomposition (SVD) is used to reduce the matrix of FIG. 2A to a product of three matrices (a term matrix, a singular matrix, and a document matrix) as shown in FIG. 2B. The singular value matrix has non-zero values only on the diagonal. Singular value decomposition is explained in U.S. Pat. No. 4,839,853, whose contents are expressly incorporated by reference.

The smaller values of the singular value matrix (and their corresponding rows and columns) are then removed. This truncation process reduces the number of dimensions (or documents or terms) from n or m to N where n,m>N. This process generates a vector space of greatly reduced dimensionality (typically a few hundred dimensions) (where N=a few hundred (for example, 300)) as shown in FIG. 3A. FIG. 3B shows a graphical relationship between m, n, and N. Of course, N may be set larger or smaller based on a variety of factors including number of documents n, number of terms m, processing power available, and the like. N=300 works well for a standard desktop computer. In one approach, the number of terms or documents is not reduced when reducing the number of dimensions. Rather, the resulting vector space (of dimension N) is based on the largest singular values (the square roots of the eigenvalues of the singular matrix of FIG. 2B. As the number of dimensions is reduced, the size of each eigenvalue is reduced as well. FIG. 3A shows the size of the matrix 301 from FIG. 2A being reduced to matrix 302. Alternatively, the number of terms or documents may be reduced. This process may be implemented on any standard computer or computers. For example, one may use a 1.8 GHz Pentium IV with 1 GB of RAM. One may also use a Sun Blade workstation or other related platform. The program or programs may be written in Linux, Java (by Sun Microsystems, Inc.), as a control (for example, ActiveX by the Microsoft Corporation), or in other languages.

Figure 4:
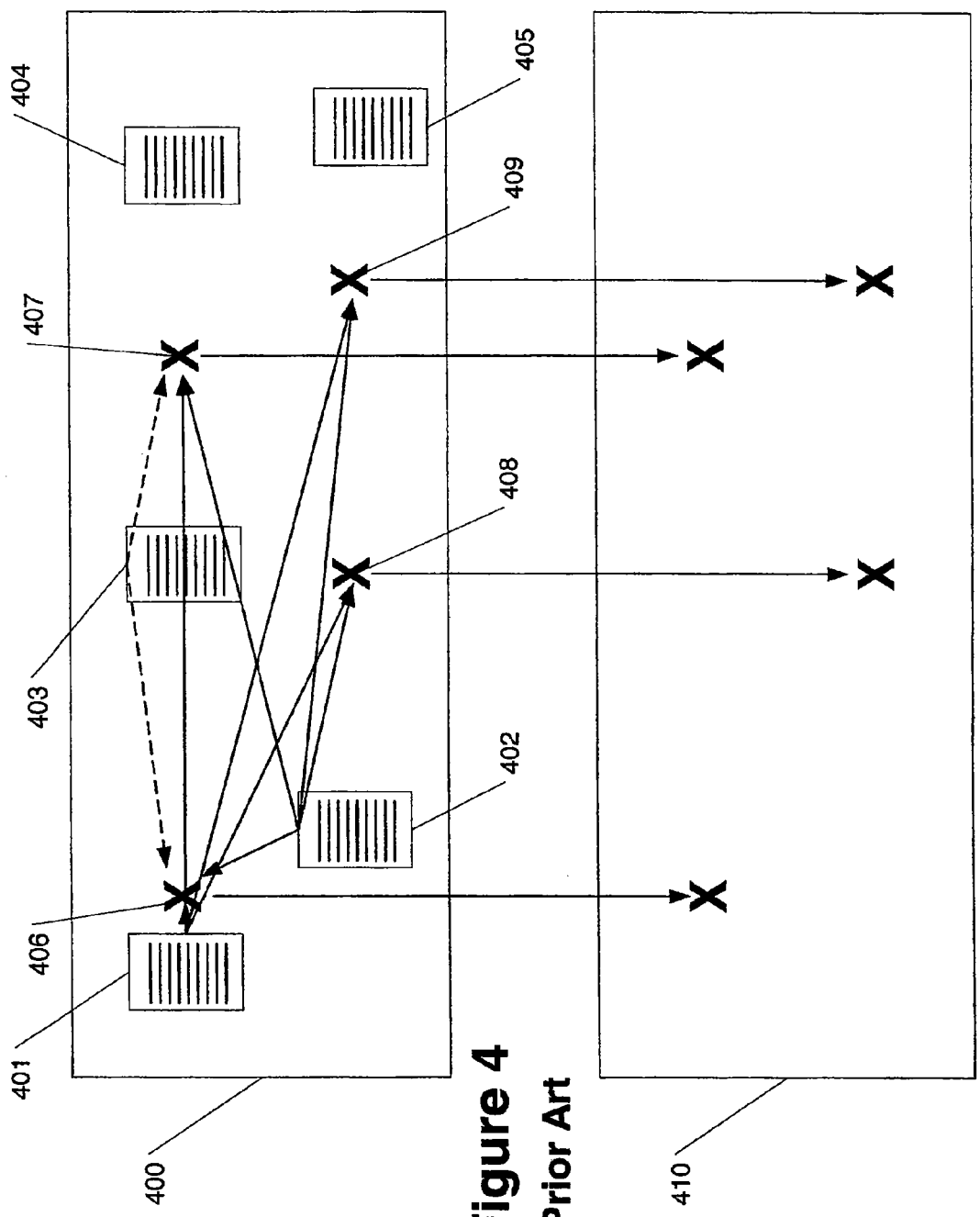
FIG. 4 shows a representation of document and term vectors and the representation of only term vectors.

Both the terms and documents may be represented in vector space. FIG. 4 shows documents 401-405 and terms 406-409 in vector space 400. For each document (401, for example) it may be spaced relative to the terms it includes. Document 401 contains terms represented at points 406, 407, 408 and 409 and, accordingly, includes references to each term. The other documents 402-405 include terms as well (represented by the arrows pointing to the various terms).

A document may be located in LSI space by averaging the vectors of its constituent terms. The term vectors may be defined in absolute coordinates (relative to an origin). The LSI process (matrix formation, SVD, dimensionality reduction) creates a set of axes, which represent the principal axes of variation of the information in the documents, which were processed to form the space. These axes correspond to underlying intrinsic concepts reflected in the aggregate of the documents.

Also, the terms may be defined by their location compared to the documents 401, 402 and 403 as well, as is know in the art. The other links between terms and documents are not shown for simplicity. Vector space 410 shows just the terms 406-409 being represented. Accordingly, queries may be made (based on single term or a whole page or more of terms) and the determining a location for the query based on folding into the LSI space the term or terms in the query. The more terms in the query, the better representation of the query in LSI vector space 410. Public documents may be added to vector space 410. The ranking of the public documents may be determined based on the term vectors 406-409 from the non-present documents 401-403

The power of the LSI technique derives from the SVD operation, which holistically extracts relationship information among all of the terms and all of the documents indexed. The resulting LSI space (with both terms and documents) has the following features:

All terms and all documents are uniformly represented in the space;

Proximity of objects in the space has been demonstrated to be an accurate surrogate for proximity of those objects in a conceptual sense. (Proximity of two vectors in the LSI space is typically based on the cosine between those two vectors);

The positions of term vectors in the space reflect the contextual usage of those terms in all of the documents in which they occur; and LSI is data-driven. It is independent of topic, vocabulary, or language.

These characteristics of LSI have made it a powerful tool for conceptual information retrieval (see Deerwester), cross-lingual information retrieval (see Dumais, S., et al, Automatic Cross-linguistic Information Retrieval using Latent Semantic Indexing, in SIGIR'96—Workshop on Cross-Linguistic Information Retrieval, pp. 16-23, August 1996, whose contents are expressly incorporated herein by reference for any essential subject matter), and automatic document categorization (see, Dumais, S., et al, Latent Semantic Indexing LSI: TREC-3 Report, in: D. Harman (Ed.), The Third Text REtrieval Conference (TREC3) National Institute of Standards and Technology Special Publication, 1995, whose contents are expressly incorporated herein by reference for any essential subject matter). It also can be used to advantage in relationship extraction and tailored information presentation.

Other aspects of LSI include:

In conducting most analytic operations within the LSI space, only the vectors corresponding to terms are used in interpreting queries and making comparisons.

It is impossible, even in principle, to reconstruct the actual text (sequence of character strings) of a document based on its LSI vector representation.

The latter follows from the fact that there are an infinite number of combinations of terms that could produce any given LSI vector. Moreover, LSI ignores the order of terms when forming the vector for a document. The following list shows an LSI vector for a document in a 300-dimensional LSI space. (300 dimensions is a typical number used for representing general textual documents in an LSI space.) These numbers define a point in the 300-dimensional LSI space (there are 300 values). They form a concise representation of the conceptual content of the document. Once this vector has been computed, there is no information retained as to the specific words that generated it. The following is a 300 dimensional vector having 300 values.

TABLE

Vector for Defining Term Position in Vector Space
(300 Dimension - 300 Values)

| | | | | | | | |
|---|---|---|---|---|---|---|---|
| 0.000484 | −0.000119 | 0.000422 | 0.001512 | 0.0002 | 0.000207 | 0.001248 | 0.000468 |
| 0.001139 | 0.000331 | −0.000732 | 0.000009 | 0.000029 | 0.000335 | 0.000709 | 0.000137 |
| 0.000378 | 0.000253 | 0.000271 | 0.000151 | 0.000446 | 0.000023 | −0.000503 | 0.000251 |
| −0.000544 | 0.000211 | 0.000184 | 0.000301 | 0.000132 | 0.000714 | 0.000647 | 0.000106 |
| 0.00005 | 0.001289 | 0.001109 | 0.00025 | 0.000106 | 0.000129 | −0.00018 | −0.000217 |
| −0.000318 | −0.0002 | 0.000555 | 0.000301 | −0.000019 | −0.000201 | 0.000637 | −0.000141 |
| 0.000175 | 0.00033 | 0.000077 | −0.00017 | 0.000039 | 0.000111 | 0.000422 | 0.000233 |
| 0.000248 | −0.00055 | −0.00029 | −0.000216 | −0.00026 | 0.000101 | 0.000746 | −0.000192 |
| 0.000598 | 0.000089 | −0.000082 | 0.000447 | 0.000465 | 0.000341 | 0.000016 | 0.000148 |
| −0.000263 | −0.000157 | −0.000358 | −0.000642 | 0.00024 | 0.000144 | −0.00118 | −0.000356 |
| 0.000846 | −0.000094 | 0.000214 | 0.000301 | 0.000441 | −0.000013 | −0.000257 | −0.000268 |
| 0.000214 | −0.000066 | −0.000485 | 0.000292 | −0.000202 | −0.000066 | −0.000492 | 0.000462 |
| 0.000596 | 0.00047 | 0.000371 | −0.000506 | 0.00034 | −0.000232 | −0.000102 | 0.000058 |
| 0.00036 | 0.000528 | 0.000284 | 0.000617 | 0.000598 | 0.000002 | 0.000087 | −0.000175 |
| −0.00069 | 0.000252 | 0.000004 | −0.000758 | −0.000438 | 0.00017 | 0.000001 | 0.000172 |
| 0.000127 | −0.000042 | 0.000597 | 0.000282 | 0.000418 | 0.00003 | −0.000302 | −0.00057 |
| −0.000483 | 0.00048 | 0.000523 | 0.000073 | −0.000436 | 0.00004 | −0.001279 | 0.000299 |
| −0.000613 | 0.000055 | 0.000639 | −0.000787 | 0.00072 | 0.000413 | 0.000328 | −0.000369 |
| 0.00025 | 0.000242 | 0.000017 | −0.000296 | 0.000226 | −0.000327 | −0.000359 | 0.000479 |
| 0.000358 | 0.000458 | −0.000446 | −0.000202 | −0.000297 | −0.000461 | 0.000073 | 0.000308 |
| 0.000207 | 0.000367 | 0.000129 | 0.000091 | −0.000267 | −0.000436 | −0.000383 | 0.000922 |
| 0.000614 | −0.000782 | 0.000455 | 0.000228 | −0.000149 | 0.000463 | −0.00002 | −0.000524 |
| 0.000214 | 0.000002 | 0.000938 | 0.00067 | 0.000626 | 0.000373 | 0.000315 | −0.000561 |
| 0.000022 | −0.000261 | 0.000431 | −0.000026 | 0.000668 | −0.000488 | 0.00021 | 0.000419 |
| 0.000267 | 0.000329 | 0.000026 | −0.001295 | 0.000816 | −0.000155 | −0.000059 | −0.000566 |
| −0.000028 | 0.000809 | 0.000056 | −0.000552 | 0.0001 | −0.000037 | −0.000362 | 0.000655 |
| 0.000008 | −0.000838 | 0.001024 | 0.00037 | −0.000636 | 0.000407 | −0.000346 | −0.000058 |
| −0.000659 | 0.000697 | 0.000942 | 0.000694 | 0.000686 | 0.000335 | 0.000471 | −0.000826 |
| −0.000368 | −0.000126 | −0.001348 | 0.000794 | −0.000486 | −0.000329 | 0.000105 | 0.000518 |
| −0.000028 | −0.000061 | −0.000453 | −0.000366 | −0.000369 | 0.000038 | 0.000673 | −0.000063 |
| −0.00034 | −0.0006 | 0.000096 | −0.000683 | 0.000448 | −0.000299 | 0.00087 | 0.000059 |
| 0.000328 | 0.0004 | −0.00055 | 0.000012 | 0.000328 | 0.000034 | 0.000111 | −0.000777 |

TABLE-continued

Vector for Defining Term Position in Vector Space
(300 Dimension - 300 Values)

| | | | | | | | |
|---|---|---|---|---|---|---|---|
| 0.000519 | −0.000559 | 0.000852 | 0.000052 | −0.000133 | −0.000592 | −0.000325 | 0.001048 |
| −0.000319 | −0.000382 | 0.000151 | −0.000636 | −0.000754 | −0.000186 | −0.000076 | −0.000323 |
| 0.000153 | −0.000075 | 0.000469 | 0.00003 | −0.001007 | 0.000285 | −0.000149 | 0.001015 |
| −0.000182 | −0.000864 | −0.000322 | 0.000275 | −0.000887 | 0.000197 | −0.000867 | 0.000448 |
| −0.000981 | −0.000271 | 0.000344 | 0.000126 | −0.000465 | −0.000029 | 0.001096 | −0.000016 |
| 0.000098 | 0.000345 | 0.000714 | −0.000247 | | | | |

There are two principal modes in which an LSI space may be used for sharing information: sharing only terms (and their effects) (space 410 from FIG. 4) and sharing terms with selective release of documents (space 400 from FIG. 4) with rankings. Within these, there are many operational scenarios for how the information sharing may take place. The following discussion describes two instantiations of each case.

In conceptual retrieval operations using LSI, a query needs to define a point in space. A query may be treated as a pseudo-document. A representation for the query is generated by a process referred to as "folding-in". This assigns a position for the query in the LSI space that corresponds to the weighted vector average of the terms in the query (similar to the process for positioning a document vector in vector space). To accurately define N-dimensional space, one needs to be able to assign values in N-dimensions. The 2-dimensional planar representation used herein works well for conceptual understanding of the relationships and distances, although exact distances may not be represented accurately in 2-dimensional space.

The same folding-in technique is used in cross-lingual retrieval. In document categorization, documents to be categorized are treated as queries. Thus, the fundamental operations in the LSI space function based on terms. There is no requirement for all of the documents that were used in generating the LSI space to be represented in the actual space that is later used. Thus, a choice can be made as to which documents are to be included in the shared space, and which are not (including sharing none of the documents that were used to create the shared space initially).

Secure Information Exchange

The following discussion treats the specifics of implementation of the present invention regarding information sharing security using LSI. Obvious analogous specifics would relate to the various other vector spaces that could be used for the underlying representation of terms and/or documents.

Figure 5:
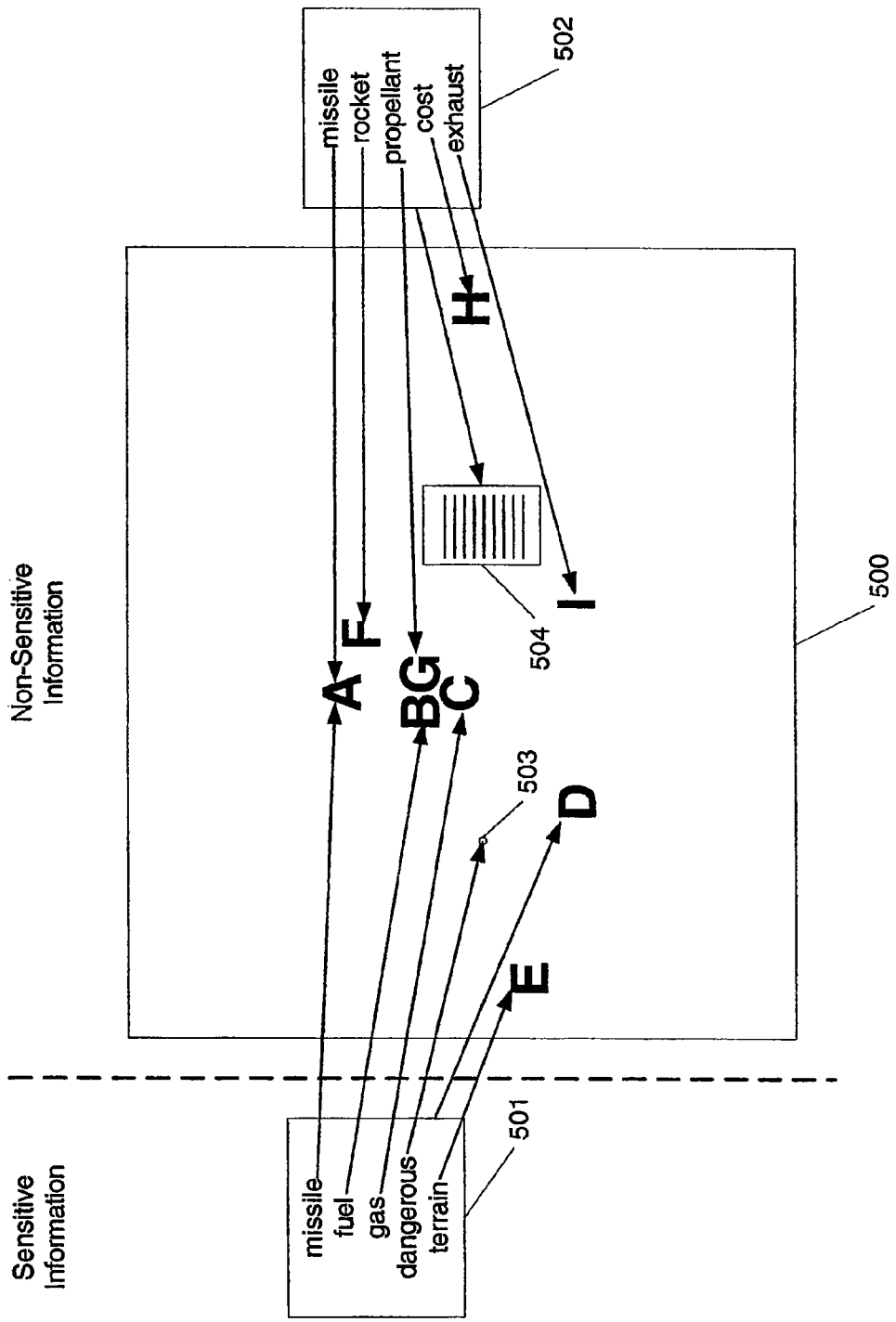
FIG. 5 shows vector space and documents in accordance with embodiments of the present invention.

FIG. 5 shows various aspects of the present invention. FIG. 5 shows two documents (501 and 502) whose terms have been mapped into vector space 500. While document 502 is in the public sector or is available for retrieval, document 501 is not. Rather, the actual document 501 is shielded from vector space 500. While the terms from document 501 are present in vector space 500, the actual document 501 is not. However, in this example, document 501 is represented by a document vector at position 503. Accordingly, if queries are made that encompass vector position 503, aspects of the present invention provide a pathway for the user to gain access (or at least attempt to gain access) to secure document 501.

The following describes how the various terms may be placed in LSI space 500. Document 501 includes the terms "missile," "fuel," "gas," "dangerous," and "terrain." Document 502 includes the terms "missile," "rocket," "propellant," "cost," and "exhaust." The terms from both documents have been placed in vector space 500. Both documents contain the term "missile" so both documents have a vector position with respect to "missile" (placed at point A). Both documents 501 and 502 include terms relating to at least one of "fuel," "gas," and "propellant." Because these terms are all conceptually related, LSI space groups them together (here as points B, C, and G). The term "dangerous" from document 501 is related to some terms discussed above but not to all, so, for example, the LSI vector space has the term "dangerous" placed at position D, near the gas-fuel-propellant terms, but farther away from other terms. Similarly, the terms "terrain" (represented by E), "exhaust" (represented by I), and "cost" (represented by H) are placed 'in vector space 500 at various locations in conjunction with their relationship to other terms. The above example is true for two documents. In general, the positions of vectors will be based on all occurrences of those terms in all documents that have been indexed.

Figure 6:
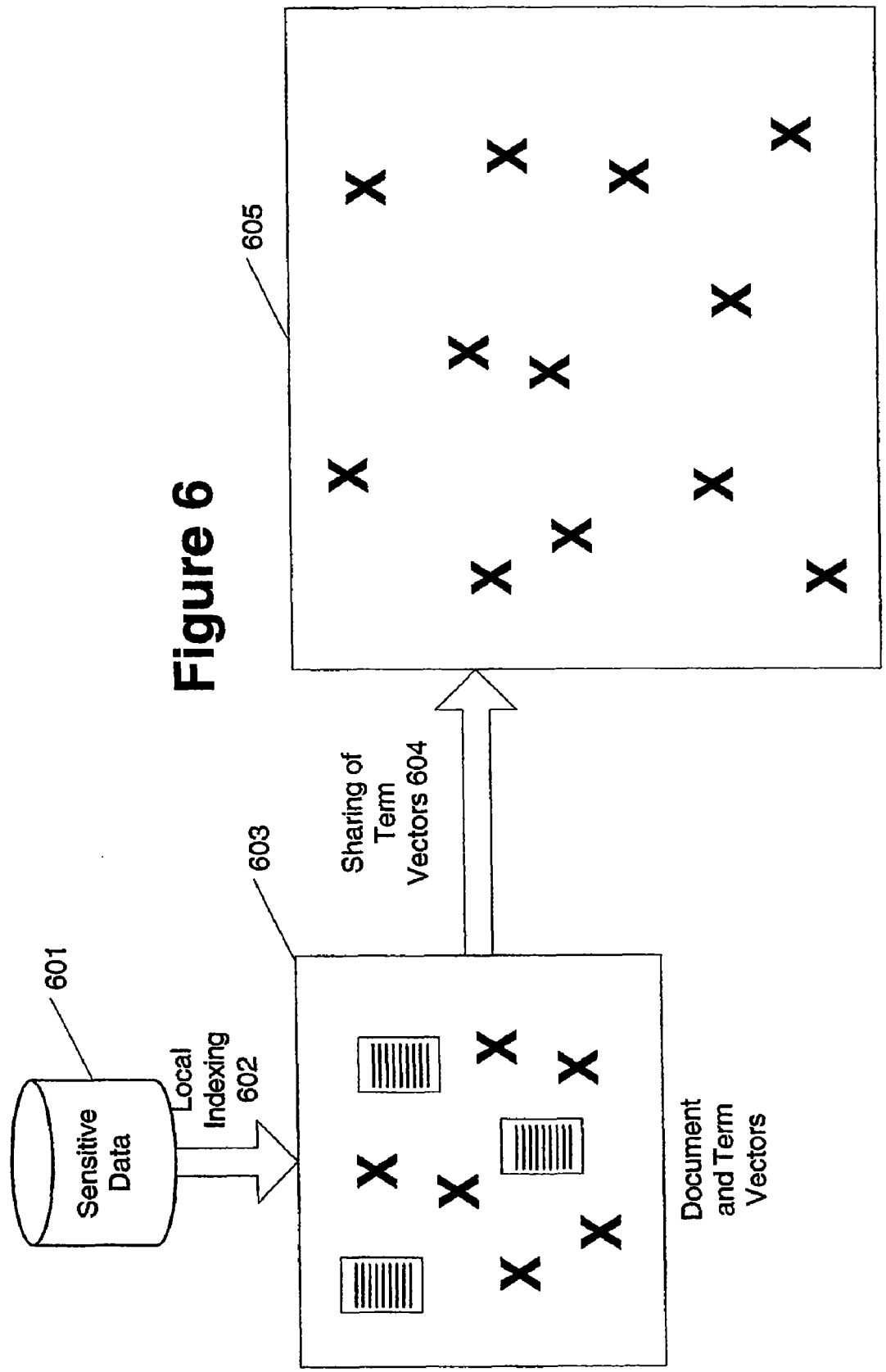
FIG. 6 shows a process for sharing term vectors in accordance with embodiments of the present invention.

FIG. 6 shows an embodiment of the invention where sensitive documents are initially indexed into a document and term vector space, and then the sensitive documents are withheld while later sharing of the term vectors. In one implementation of the present invention, the owner of a sensitive database 601 carries out local LSI indexing of the sensitive documents in the normal manner 602 into space 603. However, he or she only makes the set of LSI term vectors available to the user community through step 604, not the document vectors in space 605.

The objective of one of the implementations is to allow information from sensitive documents to be used in the analysis of other documents. The implementation does not make any of the text of any of the sensitive documents available to the users. However, it does make available the overall implications of all of the relationship information that LSI derives among all of the terms that appear in those sensitive documents. This information then can be used to advantage in the analysis of other documents. For example, the other documents may be sorted based on their relationships to terms from unavailable documents.

The shared LSI space 605 of terms has some useful properties. For example, the distribution of the terms in the shared LSI space is determined by the aggregate of the conceptual content of the sensitive documents. The LSI indexing approach generates an interesting balance between terms and documents. Terms are located at the vector average (may or may not be weighted) of the documents that contain them. Documents are located at the vector average (may or may not be weighted) of the terms that are contained within them. This second part of the dual relationship is the basis for the folding-in process. The power of LSI as a language-processing tool derives primarily from this balancing process. In creating the space, the LSI algorithms (for example, see Deerwester and U.S. Pat. No. 4,839,853) carry out a holistic analysis that takes into account all of the occurrence relationships among all of the terms in all of the documents that are indexed. This comprehensive relationship analysis of terms and documents (contexts) is what generates one of the characteristics of the LSI space: vector proximity in the space turns out to be a surrogate for conceptual relatedness. Aspects of the present invention take advantage of this extracted relationship information without risking exposing the text of the sensitive documents that are indexed.

Figure 13:
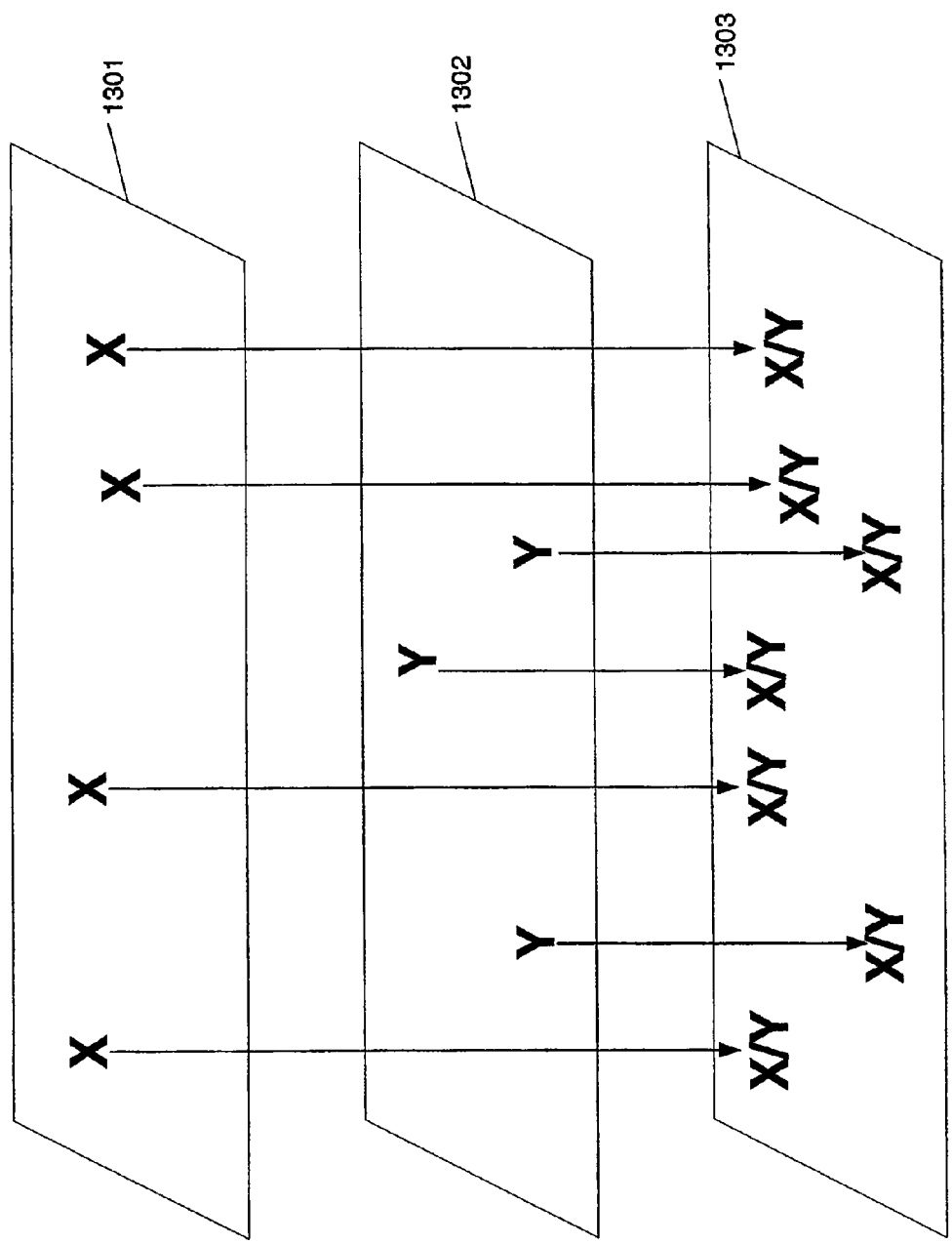
FIG. 13 shows a representation of terms from multiple languages combined into a single vector space.

Within the shared LSI space 605 produced as described above, the overall organization of the space is driven by the conceptual content of the sensitive documents. Within this overall structure, significant aspects of the space are driven by the general properties of the language used in the documents that were indexed. The LSI technique deals with character strings and thus is inherently independent of the specific language in which the documents are written. The details of the term positioning, however, are controlled by the aggregate relationship information contained in the sensitive documents. For example, FIG. 13 shows terms in a first language 1301 being combined with terms from a second language 1302, resulting in vector space 1303 that may be queried for documents within vector space 1303, regardless of the language. Here, one may accurately represent documents in either language in this multilingual space since both terms are present in the LSI vector space 1303.

Figure 7:
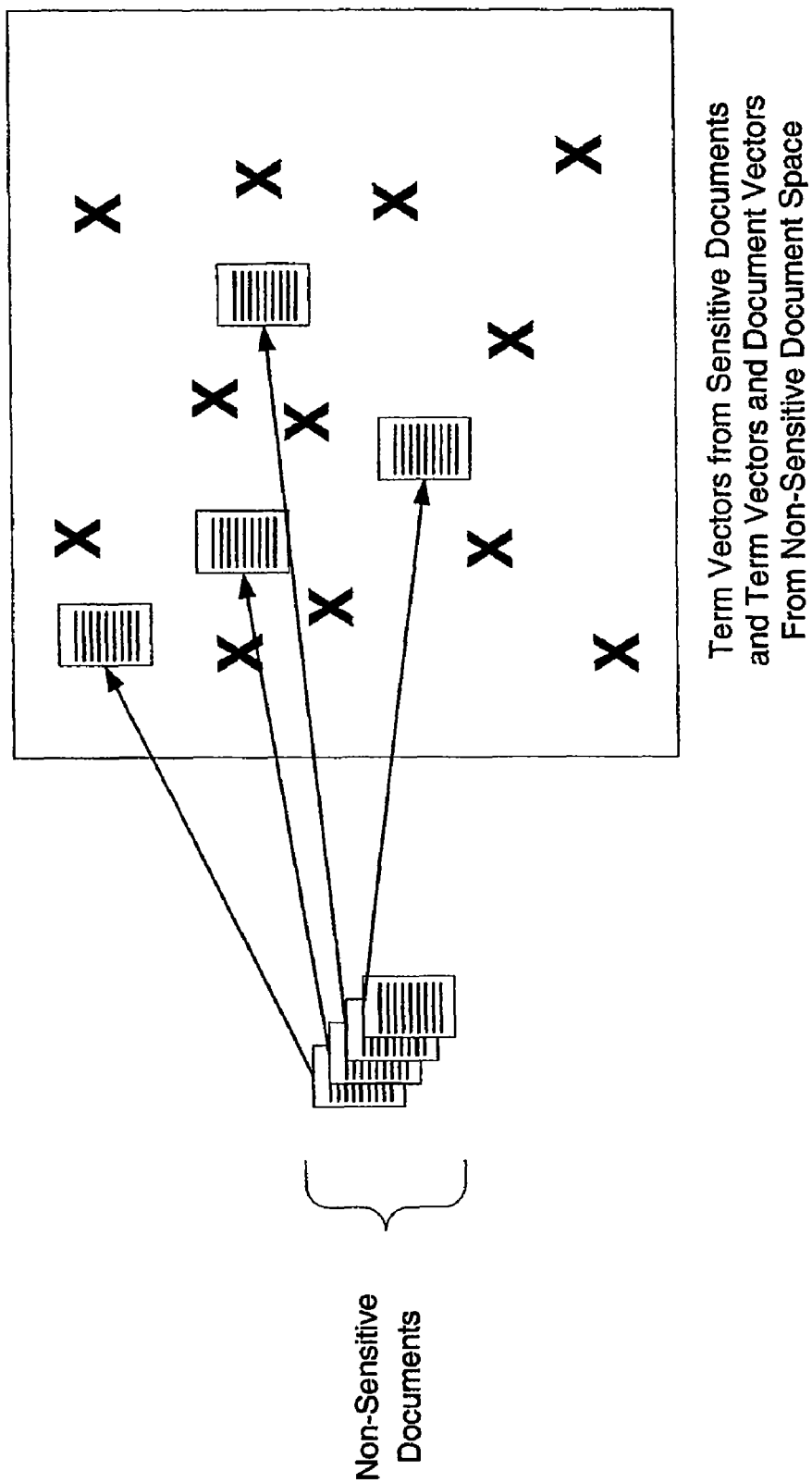
FIG. 7 shows a process of populating vector space with non-sensitive documents in accordance with embodiments of the present invention.

The extracted relationship information from the sensitive documents can be taken into account directly in the processing of other documents. For example, collections of non-sensitive (or at least less-sensitive) documents may be folded into the shared LSI space as shown in FIG. 7 (see, Deerwester). The folding-in process locates each document at the (weighted) vector average of the term vectors for the terms that it contains. However, all of the term vectors in this shared LSI space were initially derived from the sensitive documents. Thus, these non-sensitive documents end up with positions in the space that are driven by the conceptual content of the sensitive documents. These positions reflect comprehensive extraction of relationship information contained in the sensitive documents.

In one example, the folding-in process does not change any of the term locations. Thus, irrespective of the number of non-sensitive documents being worked with, it is the relationships implied in the sensitive documents that control the analytic operations in this shared LSI space. Users without additional permissions can only retrieve and work with the non-sensitive documents. However, every information-processing operation that is carried out in the space may be informed by the conceptual content of the sensitive documents.

In conducting analytic operations, the shared LSI space that is created based on at least the terms from secure information sources can be used in a similar manner as any LSI space that was created in a more conventional manner. For example, conceptual queries, cross-lingual queries, and document categorization operations are carried out on documents in this space using the standard folding-in process. One point, however, is that these operations now automatically reflect all of the term relationship information that was contained in the sensitive documents. Thus, the conceptual content of the sensitive documents can be brought to bear implicitly in analytic operations carried out on the non-sensitive documents.

As described above, the disclosed system and method work better when the conceptual content of the sensitive documents and that of the non-sensitive documents is similar. In general, it is helpful (but not required) for the conceptual content (and vocabulary coverage) of the sensitive documents to span the range of concepts of analytic interest in a given application. If there are concepts and vocabulary of interest in an application that are not covered by the sensitive documents, it is desirable to augment the coverage. Other documents that cover these missing concept areas can simply be added to the sensitive documents and indexed with them. These added documents aid in generating an LSI space that is more appropriate for the overall application. The added documents affect the singular values produced in the SVD operation, and thus the conceptual mapping associated with the dimensions in the LSI space. They also contribute term vectors for any additional vocabulary contained in these documents. (In general, documents that cover additional concepts will, in aggregate, contain additional vocabulary). However, relationship information from the sensitive documents is retained. It will be modified to a greater or lesser extent based on the additional contextual implications of the added documents.

Generally, finding additional documents with which to extend the coverage of the indexed set is not particularly difficult. The exact content of these documents is not of particular importance. They only have to cover the additional concepts/topics of interest in the application. Large archives of documents are readily available that can be used for this purpose. For example, consider an application where the sensitive documents describe research projects. Appropriate extension documents may be readily obtained from various on-line information sources (for example, the US Patent and Trademark Office server or from online databases of technical documents that are maintained by professional and technical societies). Similarly, in a more general application, large archives of newspaper articles are available online. For most desired conceptual extensions, relevant articles could readily be retrieved. Simple Boolean queries into these archives readily would yield candidate articles. The vast growth of full-text data on the Internet provides a wealth of material for conceptual refinements and extensions.

A corresponding approach may be taken to augmenting the vocabulary coverage of the shared space. When queries (which may be treated as documents that are folded into the vector space) or documents are folded into the shared LSI space, they may be located at the (weighted or non-weighted as described above with respect to FIGS. 2A and 2B) vector average of the vectors for the terms that occur within them. For some terms from those queries (or documents), there will be no corresponding term vector already in the space. Such terms may not play a part in the positioning of that query (document). In general, there may be many vocabulary terms that are used in the non-sensitive documents that were not used in the sensitive documents. In aggregate, the non-sensitive documents may contain a great deal of information about the conceptual relationships among those terms and the terms that are represented by vectors in the space. In one example, one may extract this aggregate relationship information from the non-sensitive documents and use it to create appropriate term vectors for this additional vocabulary. In another example, the aggregate information is not extracted.

The following provides an example of how to fold-in the additional information. As each non-sensitive document is folded into the shared LSI space, a document vector is created for that document. For each such document, terms that occur in that document for which there are no existing term vectors in the shared space are considered. The logical vector to associate with each such term is a vector with the same components as the document vector for that document. That is, if the only context in which that term appears is that of this one document, then a good estimate that one can make of the conceptual "content" of that term is the same as that of the document.

This process is continued as non-sensitive documents are folded into the non-sensitive document and term space. When additional instances of the new term are encountered, the vector of the new term may be refined based on this additional contextual information. In that the position of term vectors is the (weighted or not) vector average of the documents in which that term is contained, the term may be accurately placed in the same space. In this technique, the various occurrences in the document for each new term, whose position is being determined, are monitored. At each point in the process, the new term is assigned a position given by the (possibly weighted or not) vector average of the documents in which it has occurred. That is, as each additional instance of that new term occurs, the document vector, in which it occurred, is added to the set of document vectors being averaged to produce a more refined estimate of the position for that term vector.

This process does not produce term vectors that are as accurate (in terms of conceptual positioning) as those that are produced by the full LSI process involving the SVD. However, in most cases, it will produce term vectors for the new terminology that are relatively adequate. This process also identifies documents that can be used in an iterative refinement process for the space. After some number of non-sensitive documents have been folded in, one selects a subset of these documents to use as an extension of the sensitive documents in the full LSI indexing carried out by the owner of the sensitive documents. The best documents for this purpose typically will be the ones that contain the maximum number of new terms. These documents may then be transmitted to the owner of the sensitive database. He or she may then add them to the sensitive documents and carry out a full LSI indexing on this combined set using the SVD operation. The resulting term vectors then may be sent back to replace the term vectors in use in the shared LSI space. Even a few iterations of this type can be anticipated to yield a shared LSI space with highly desirable features. On the one hand, it will still retain the important relationship information derived from the sensitive documents. On the other hand, it will provide much better vocabulary coverage. This coverage may be important in accurately representing documents that contain a broad range of vocabulary.

The extension of the conceptual and vocabulary coverage does not have to wait for the type of iterations described above. A decision may be made initially to extend the conceptual and vocabulary coverage based on combining the sensitive documents with a number of non-sensitive documents chosen for this purpose. The full LSI processing may be carried out on this combined set. The term vectors then may be shared as described above. If the non-sensitive documents are of interest to users, the document vectors for these non-sensitive documents may be transmitted and represented in the shared space. Those documents then will be available for retrieval by users.

In a variety of applications, it will be desirable to emphasize the relationship information among terms as derived from the sensitive documents as compared to that derived from the non-sensitive documents that contain those same terms. In such cases, it is desirable to limit the number of non-sensitive documents that are combined with the sensitive documents for the full LSI processing. There are many ways in which this may be done. A simple, yet relatively effective method for doing this may be based on term occurrence. In this approach, a maximum number, N, of non-sensitive documents is chosen, such that N is not large with respect to the number of sensitive documents. The N non-sensitive documents that contribute the largest number of new vocabulary terms are then chosen as the set to be combined with the sensitive documents. In general, maximizing new vocabulary may be correlated with maximizing new conceptual content. Thus, this approach may support both objectives: expanding vocabulary coverage and expanding conceptual coverage.

In some applications, it will be desirable to combine the influences of more than one sensitive database in a single shared LSI database. If a single entity can be given access to all of the sensitive databases, this may be done by combining the documents from each of the sensitive databases into the set for local LSI indexing. In some cases, however, due to the sensitivity of the information, no one entity can be given access to all of the sensitive databases. This situation should be addressed in the shared LSI space.

In corresponding implementations of the present invention, a body of documents that are not sensitive is used to coordinate the indexing operations. Using this approach, information from any number of independent sensitive databases may be combined in a shared manner.

Figure 8:
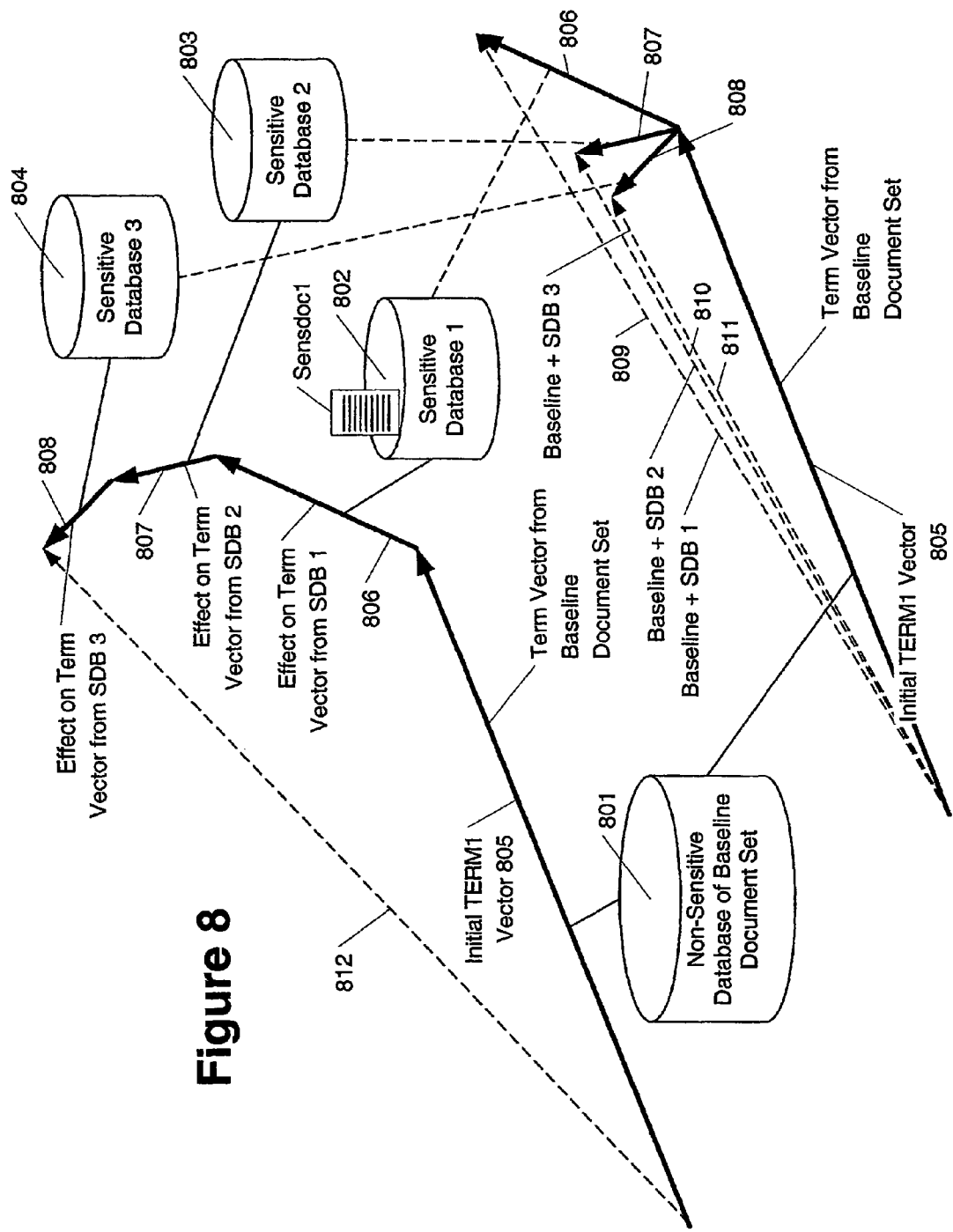
FIG. 8 shows the effects of new vector information on existing vectors in accordance with embodiments of the present invention.

In order to combine the effects of multiple sensitive databases in the shared space, another generalization of the folding-in process is applied. Above, term vectors for new vocabulary were added to the shared LSI space by sequentially folding in non-sensitive documents. In the case of combining influences of multiple sensitive databases, aggregate term vectors are created that reflect the influences of each of these databases. This may be accomplish by. sharing a baseline set of term vectors and refining the positions of these vectors to reflect the relationship information in the multiple sets of sensitive documents. FIG. 8 shows an example of this process for a case where there are three sensitive databases that must remain segregated. Given the opportunity, combining the effects of multiple databases in a single LSI indexing is preferential, as a single LSI indexing is a more accurate process than the folding-in processes. (Accuracy as used herein refers to the fidelity with which the resulting vectors reflect the conceptual relations extant in the documents being processed.)

Referring to FIG. 8, a baseline set of non-sensitive documents 801 is shared among the owners of the three sensitive databases 802-804 and the operator of the shared LSI space. These documents in 801 may be generally representative of the types of information that will be encountered. It is desirable that they cover a high percentage of the individual terms that are present in the sensitive databases. In many applications, there is a shared body of knowledge that may be drawn upon to create this shared document set 801. In other cases, a generic source of text may be used. For example, if the sensitive data to be worked with consists of patent applications, a set of common indexing documents may be created from patents that have already been issued, and thus are publicly available. If the sensitive databases include intelligence reporting, newspaper articles on related subjects might be used as a common indexing set.

Referring to FIG. 8, the operator of the shared LSI space indexes the common document 801 set using standard LSI indexing. This establishes baseline vectors (for example, vectors 805) for all of the terms that occur in the baseline data set. That baseline set of term vectors is transmitted to each of the owners of the sensitive databases. These owners each create a modified version of this collection of term vectors. These versions reflect the influence of their sensitive documents on the baseline term vector positions. There are two principal methods for them to do this. The simplest approach is for them to create modified term vectors based on a folding-in process. This imposes minimum computational requirements but incurs the slight inaccuracies of the folding-in process, as compared to the full LSI indexing process. The alternative method is for each owner of one of the sensitive databases to combine his or her sensitive documents with the non-sensitive baseline documents and carry out the full LSI indexing operation on the combination. This yields the most accurate vector positions, but incurs higher computational requirements.

In the first approach, the owners of the sensitive databases calculate two types of modifications for the baseline collection of term vectors. The first type of calculation is the same as the procedure described above for expanding the vocabulary coverage of the shared LSI space based on folding in non-sensitive documents. The owner of each sensitive database carries out a folding-in process, folding his or her sensitive documents into the space of the baseline term vectors. This establishes locations for new term vectors corresponding to all terms that occur in that sensitive database, but do not occur in the baseline set of documents. The other calculation establishes offsets for term vectors corresponding to terms that occur both in the baseline document set and in the sensitive documents. These offsets are calculated in an analogous fashion to the continuing refinement of the term vectors for the unique vocabulary.

For example, assume that TERM is a term that occurs both in the baseline set of documents and in the sensitive database. There exists a location for the term vector corresponding to TERM1 in the vector space composed of the baseline term vectors. This location has been determined by the occurrence of TERM1 in some number of documents in the shared baseline document set. Let M denote this number. During the folding-in operation for the sensitive documents, documents may be encountered that contain TERM1. A sensitive document SENSDOC1 from the sensitive document collection that contains an occurrence of the term TERM1 is encountered. For each such instance, a new position for the term vector belonging to TERM is calculated (805 to 808). This new position is a combination of the document position vector corresponding to SENSDOC1 and the term position for TERM1 from the baseline document set. This combination may be a weighted vector average, taking into account that TERM1 occurred M times in the baseline document set. Thus, the weighting of the contribution of the term vector from the baseline set should be M times as great as that of the contribution from SENSDOC1. This process is continued in a manner analogous to that in the case of expanding vocabulary by folding in non-sensitive documents as described above. As additional documents are encountered that contain TERM1, the position of the term vector 809 for TERM1 is continually refined, based on the additional contributions from each such occurrence. This process is continued from database 802 through database 804 and all documents associated with this process on the databases. The resulting modifications of the term vector 805 are shown as 809, 810, 811, respectively. If the modifications to the term vector is combined the resulting vector is shown as 812.

Here, this approach requires that the value of M corresponding to each term in the common document set must be calculated. This value is not generated by typical commercial implementations of LSI software. However, it requires only a small change in the software to produce this set of numbers. For example, one may keep track of how may times each term occurred in the baseline document set. The number of occurrences may be used to weight their influence. One possible way of keeping this information is to create a table where the entries are the term identifier and the number of times the term occurred. The number of values in the table may be incremented during parsing of documents in creating the LSI space. The final table may have entities for each term that occurs in the baseline document collection. Each entry may be the total number of times that term occurred in that collection. Alternatively, the values of M corresponding to each term in the common document set may be calculated from parsing that set and collecting the appropriate statistics.

At this point, for each sensitive database 802-804, a set of term vectors which differs from the original set as derived from the LSI indexing of the baseline shared document set is obtained. This new set differs in that it contains both additional vectors and vectors whose positions have been modified. For each term vector whose position has been modified, one can determine an offset vector that corresponds to the difference between the term vector from the shared baseline documents and the term vector for that same term in the modified set. The offset vectors (806, 807, and 808) and the new vectors (809, 810, and 811) then may be transferred back to the shared LSI space, and used to update that vector (812). Updating in this case consists of two steps. Offset values that are transferred are used to update the values of the existing term vectors in the shared LSI space. New term vectors that are transferred are added to the shared LSI space. Alternatively, the offsets may not be combined to keep the information sets from databases 802-804 separate.

Because the operations described here are linear, one may combine the results of the calculations carried out by each of the individual owners of the sensitive databases. For term vectors corresponding to terms that are unique to one of the sensitive databases, one may add this term vector to the set of vectors in the shared LSI space. For other term vectors, one may apply appropriate weightings to reflect the relative strengths of the contributions of each database. For example, consider a case where TERM2 occurs in the shared baseline document set and in all three of the sensitive databases. The position of the term vector is modified for TERM2 by combining the offsets from each of the sensitive databases 802-804. In so doing, one may weight the offset contributions from each of the sensitive databases in accordance with how many occurrences of TERM2 there are in each of these databases. Thus, in one case, an offset from a sensitive database that included 10 occurrences of TERM2 would be accorded 10 times the weight of the offset from a sensitive database in which TERM2 occurred only once. In actual practice, more complex weighting schemes may be employed.

There also will be cases in which a term, TERM3, does not occur in the shared baseline set of documents, but occurs in more than one of the sensitive databases. Each sensitive database may transmit a term vector for TERM3 to the shared LSI database. These term vectors for TERM3 may be combined, again using a weighting factor that reflects the relative number of occurrences of TERM3 in each of the sensitive databases. The combined term vector may then be added to the shared LSI space.

There are a number of variations on the above techniques that will be apparent to anyone skilled in the art. For example, if the relative importance of the information in the sensitive databases is perceived as being significantly different, a differential weighting scheme may be employed in order to emphasize the contributions from the more important databases.

The second approach to combining multiple sensitive databases is for the owners of the individual sensitive databases to carry out a full LSI indexing, as opposed to employing the folding-in process. In this approach, they may combine their sensitive documents with the shared baseline set of documents and perform a full LSI indexing operation on their combined sets. For each sensitive database owner, this may yield a local LSI space that will contain term vectors both for the terms in the common document set and in their sensitive documents. Carrying out the full LSI indexing procedure will yield slightly different positions for the term vectors in their resulting spaces, as compared to the positions they would obtain from the folding-in process described above. These vector positions (for new vocabulary) and vector offsets (for terms that occur in the common set of non-sensitive documents) then may then be transferred to the shared LSI space as described above. They then would be treated exactly as the vectors and offsets from the folding-in approach described above.

The above examples dealt with cases where only the term vectors are shared. It also is possible to implement secure data sharing operations in which both term vectors and document vectors are shared. As noted above, the LSI vector for a document represents the aggregate conceptual content of that document. There is generally no accepted practical way to work back from those vectors to recover the actual text of those documents. Thus, these document vectors may be represented in a shared LSI space without compromising the contents of the sensitive documents. The intent is not to provide direct access for users to the sensitive documents themselves. Rather, the idea is to allow comparisons among user interests and activities and conceptually related documents. This can provide a basis for informed decision-making regarding the release of selected sensitive documents to individual users.

Figure 9:
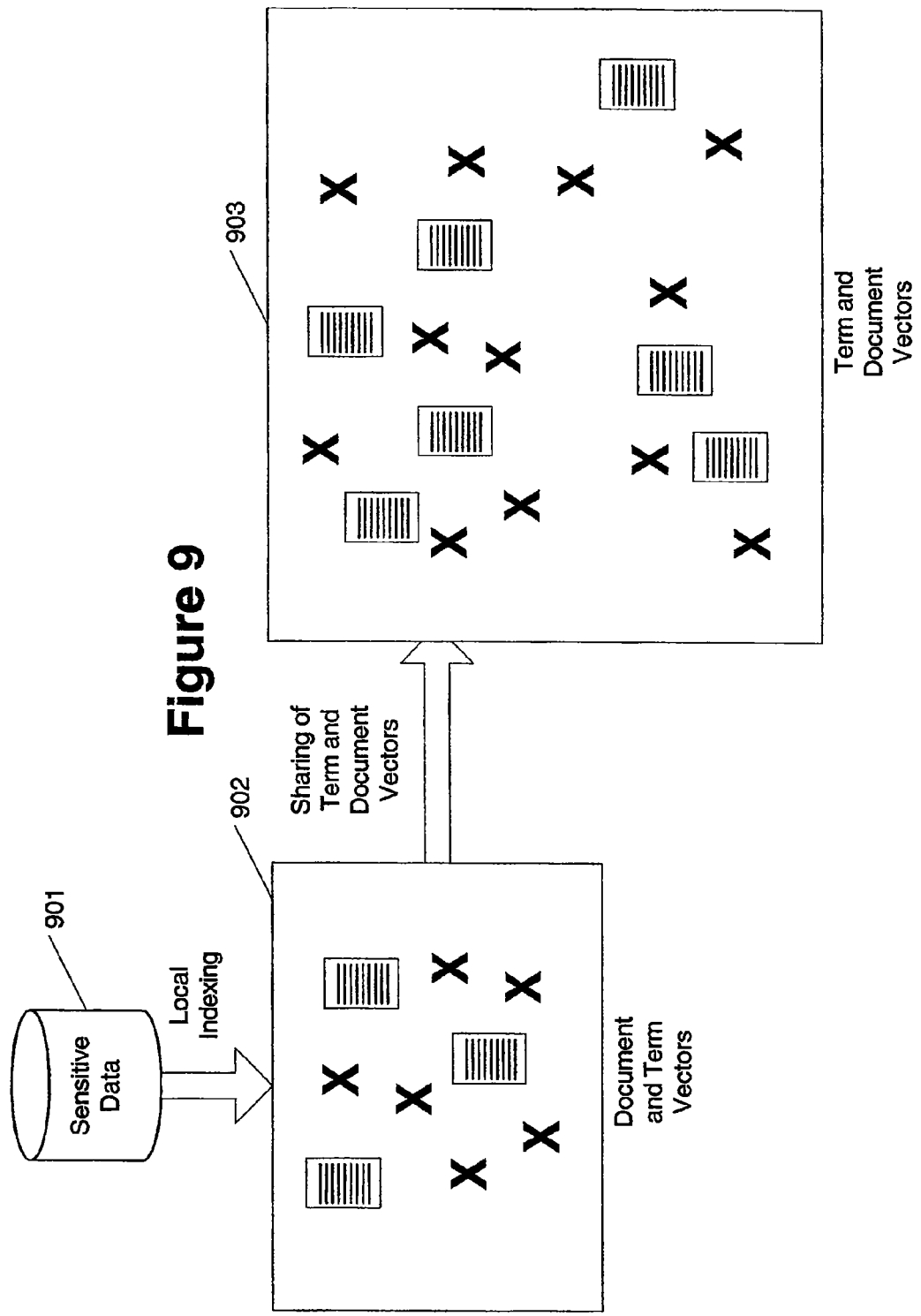
FIG. 9 shows a process for sharing term and document vectors in accordance with embodiments of the present invention.

FIG. 9 shows a case in which both term vectors and document vectors are shared. Sensitive data from database 901 is locally indexed into a LSI space of document and term vectors 902. Space 902 may then be shared and added to a larger set of term and document vectors 903.

Figure 10:
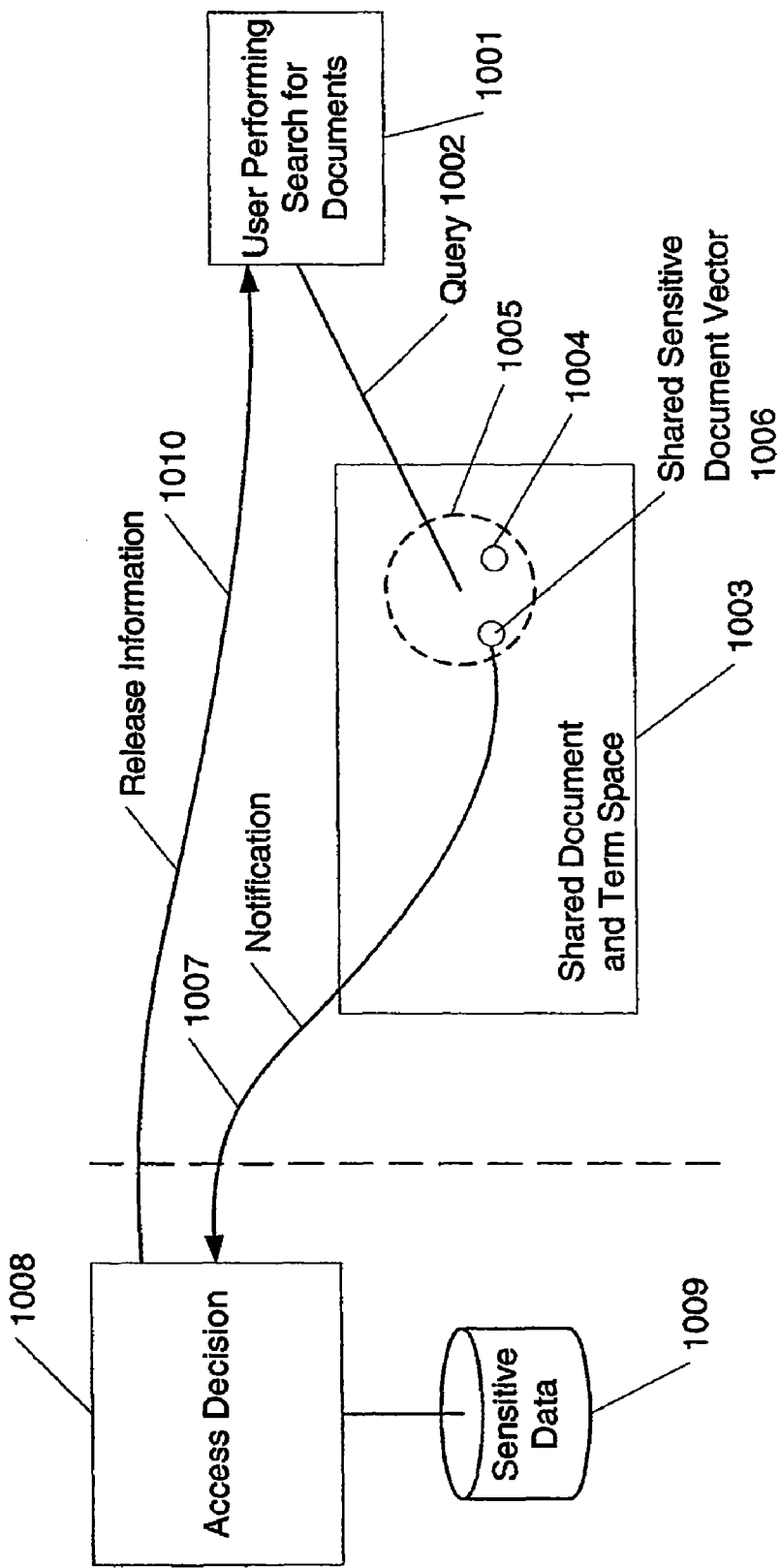
FIG. 10 shows a process for receiving access to secure documents in accordance with embodiments of the present invention.

There are a variety of operational scenarios in which such shared document vectors can be used to make informed decisions regarding release of individual sensitive documents to individual users. FIG. 10 shows one method through which such release may be determined.

In the scenario of FIG. 10, a user 1001 is conducting research or analysis activities 1002 involving information retrieval from the shared LSI space 1003. Shared LSI space 1003 may be running on a system including one or more storage systems (storing the various vectors) as are known in the art and a processor for handling various queries (for example, a 2 Ghz Pentium IV with 1 GB of RAM). In general, there may be non-sensitive documents represented in this shared space, either through direct LSI indexing or through the folding-in process. In response to a query 1002 from the user 1001 (for example, received through an input including but not limited to a network connection, over the Internet, from a system bus, local or remote, and the like), non-sensitive documents whose document vectors 1004 are within some threshold 1005 of the query are returned directly to the user 1001 as results. In some cases, one or more document vectors 1005 corresponding to sensitive documents may lie within a given threshold 1005 of the user's query 1002. In such cases, a message 1007 noting that the user's query is in proximity to the document vector of a sensitive document may be sent (via an output including but not limited to a network connection, over the Internet, from a system bus, local or remote, and the like) to an adjudication authority or the author of the sensitive document 1008. Depending on the operational scenario, this authority may be a supervisor of the user, the owner of the sensitive database containing that document, or a trusted third party. Based either on a single such event or on a pattern of such events, the adjudicating authority 1008 makes a decision regarding release 1010 of the information in that sensitive document (stored in sensitive data storage 1009) to the user 1001.

This process has the advantage that release decisions may be made based on demonstrated applicability of the information in the document to the task assignment of the user. The adjudicating party has several choices available regarding document release. If only a single sensitive document is involved, he or she may decide to release the information from that one document to the user. If an appropriate pattern of user applicability is observed, the authority may make a decision to release a set of documents, based on content, source, or both. Depending on the implementation, the user may or may not be made aware of the fact that a query that he or she has created falls in proximity to the document vector of a sensitive document.

Figure 11:
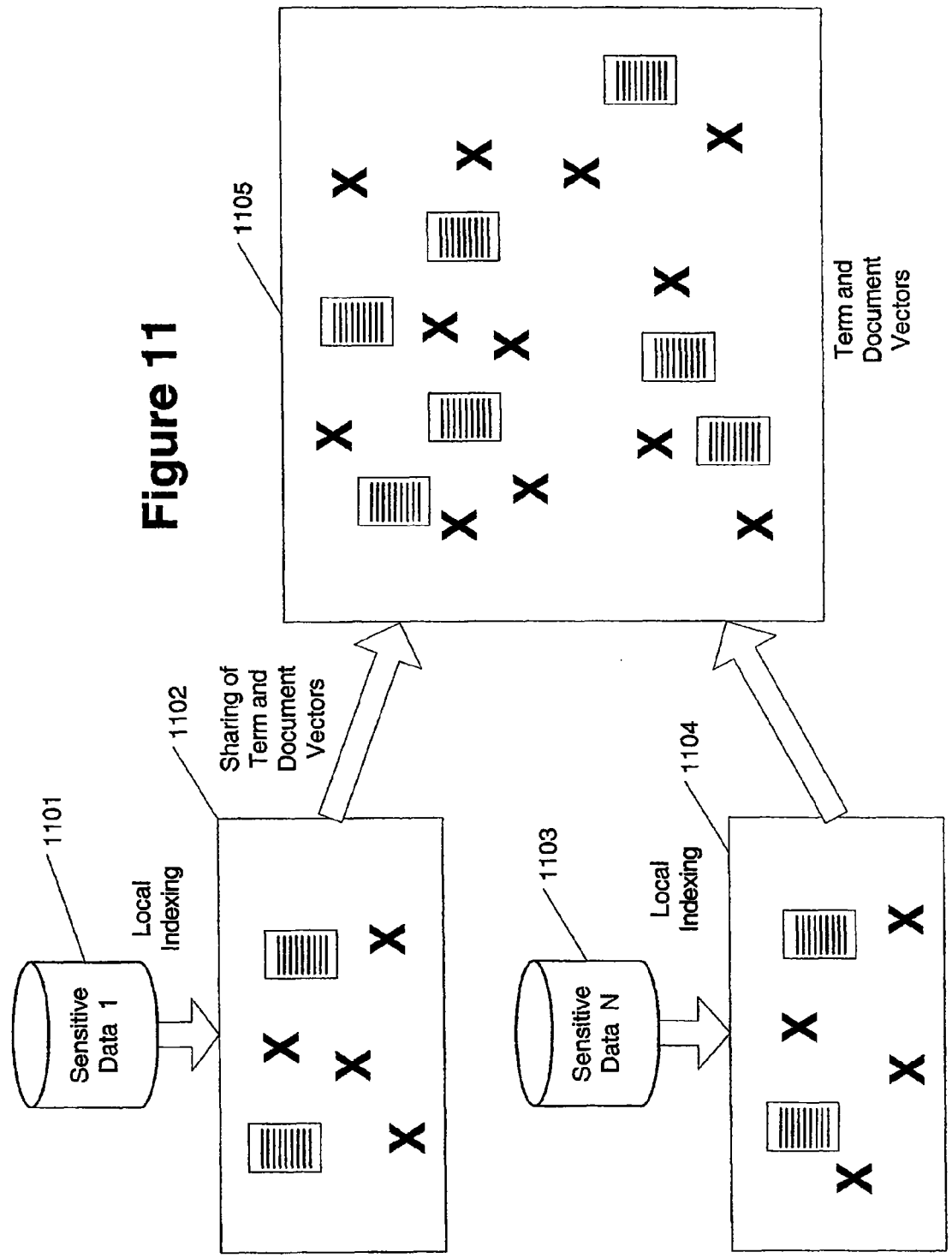
FIG. 11 shows large scale sharing of term and document vectors in accordance with embodiments of the present invention.

As shown in FIG. 11, this approach to sharing of information can be applied in cases where there is more than one sensitive database. In such a case, the term vectors in the shared space are produced in the fashion described above, sensitive databases 1101 and 1103 having documents from which term and document vectors are extracted 1102 and 1104. The document vectors in the shared space 1105 then are produced based on the weighted average of their constituent terms, also as described above. The documents thus are located based on the combined relationship information from the multiple sensitive databases.

In this implementation, document vectors corresponding to sensitive documents appear in the shared database 1105. The corresponding documents are not made directly available to users. Even the operator of the shared database cannot get back to the original documents. However, an individual with control over the shared database could determine the general (conceptual) nature of the sensitive documents. This possibility can be avoided through a variant shown in FIG. 12.

Figure 12:
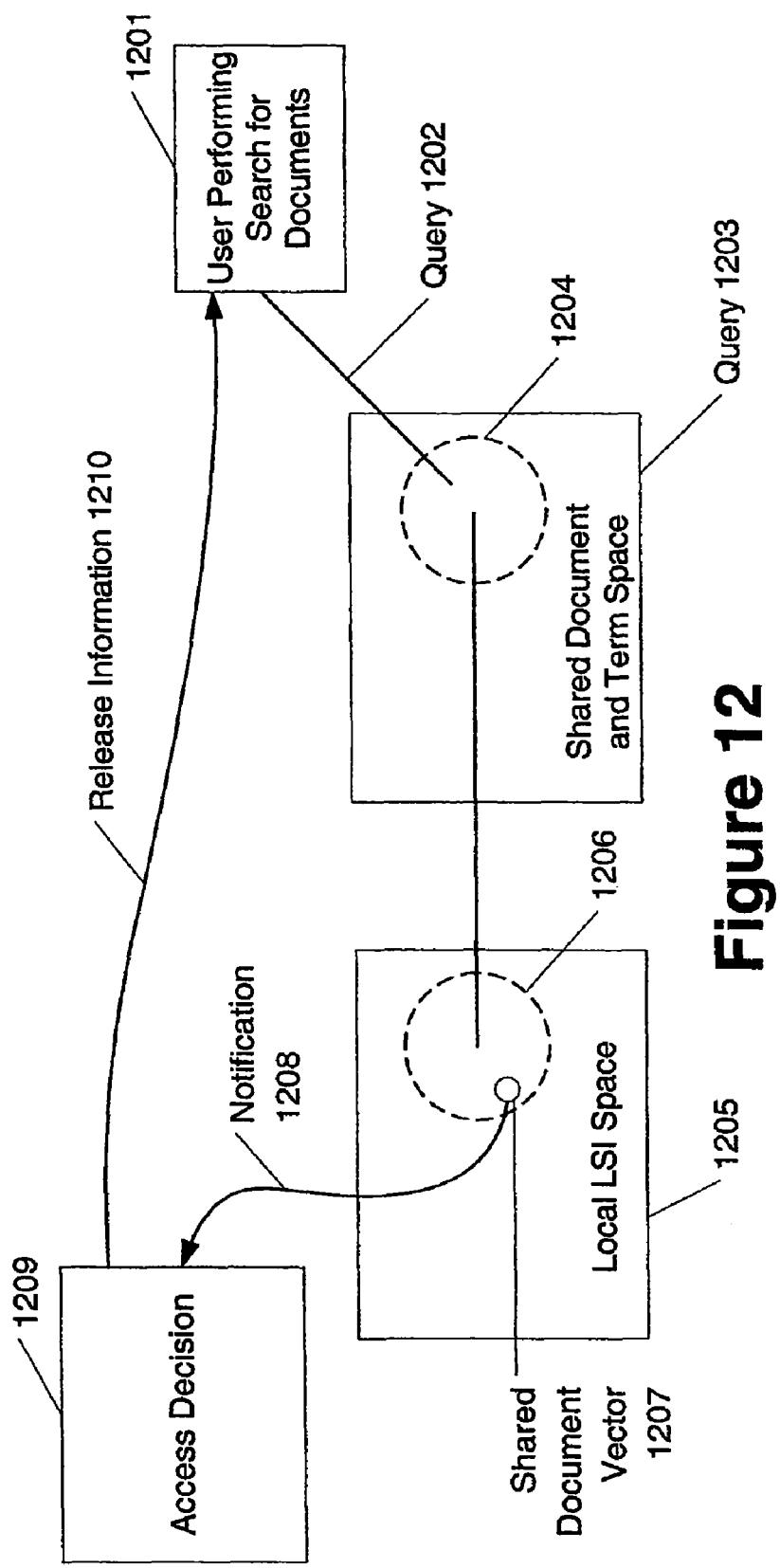
FIG. 12 shows another process for receiving access to secure documents in accordance with embodiments of the present invention.

In this implementation of FIG. 12, document vectors corresponding to sensitive documents are not shared. Rather, the user's queries (or LSI vector representations of them) are sent to the owners of the sensitive databases. A user 1201 performs a query 1202 on shared document and term space 1203. Term space 1203 and local LSI space may be supported by a storage device and one or more processors. The two spaces 1203 and 1205 may be remote, local, or the same processor. These queries 1202 may be folded into the local LSI space 1205, which includes document vectors 1207 for the sensitive documents. When one (or more) of these queries 1202 appears in proximity 1206 to one of the sensitive documents, the owner 1209 of the sensitive database (or other trusted party) then can make an access decision 1210, as described above. This approach has the advantage of not revealing even the general nature of the sensitive documents. However, it does so at a cost of having to transmit queries 1202 to the owners 1209 of the sensitive databases. The LSI database(s) maintained locally by the owner(s) of the sensitive database(s) do not have to be as robust as the shared LSI space. The local LSI databases can be based solely or primarily on the sensitive databases, thus minimizing local storage and processing requirements. The query 1202 itself can be folded into the local space for comparisons 1205. Alternatively, if the spaces are sufficiently similar, an LSI query vector from the shared space may be directly used for comparisons in the local space(s). The above system may include inputs (including but not limited to a network connection, over the Internet, from a system bus, local or remote, and the like) for receiving queries into spaces 1203 and 1205 and outputs (including but not limited to a network connection, over the Internet, from a system bus, local or remote, and the like) for outputting information from spaces 1203 and 1205.

In some cases, it may be undesirable to directly release the information in a given sensitive document directly to a user. In such a case, the LSI space may be used to advantage in creating a new document that is appropriate for release. The sensitive document in question may be used as a query into an LSI space in which a large number of related but non-sensitive documents have been indexed. The closest documents in that space will be conceptually related to the sensitive document. In some cases, it may be possible to create a new document that conveys the same general meaning as the sensitive document. This new document may be created through combining information from the conceptually related documents located by the LSI search. In general, this new document would be created by an individual who had access to the information in the sensitive report.

For each of the various techniques described herein of this invention, at least one variant exists that can provide symmetric protection. That is, protection can be provided for the details of the user's queries as well as the sensitive documents. With a conceptual matching system such as LSI, it often is desirable to form rich queries based on blocks of text. These blocks may be excerpts from documents or even whole documents that are treated as queries. Thus, in some cases, the details of the queries may be sensitive. In commercial implementations of LSI (and other vector space techniques) parsing of the queries generally is done at the retrieval engine. In order to hide the details of queries, local processing of the query may be carried out by the user. In this case, there is a local LSI space and the query is folded into this space. The resultant LSI vector representing the query is then sent to the retrieval engine associated with the shared space. This vector then can be compared directly to the document vectors in the shared space. In order to do this, there should be comparability of the LSI vectors in the user space and in the shared space. One way to accomplish this is to transmit the term vectors from the shared space to the user(s). Only the term vectors are required to create an LSI query vector locally. Thus, the potentially large and dynamic collection of document vectors from the shared space does not have to be transmitted to the users.

The techniques described above intrinsically provide high security. There are, however, measures that can be taken to enhance this security even further. In cases where document vectors corresponding to sensitive documents are shared, an individual with control of the shared LSI space may work backwards to determine the general subject matter of the information of the sensitive databases. In some cases, even this degree of disclosure should be avoided. This possibility can be mitigated through use of techniques referred to here as ghosting and dilution. In ghosting, the owner of the secure database may forward a set of documents vectors that represented the sensitive documents, mixed in with a large set of vectors that were created purely to obscure the contents of the database. These ghosting vectors would not have to correspond to actual documents. They may be created randomly. They also could be created with a purposeful structure to aid in the mitigation of topical disclosure. The ghosting vectors would be ignored by the originator in all cases, thus they would not impose any additional processing load in the local operations. At the shared database, the ghosting vectors would be indistinguishable from those corresponding to the sensitive documents. Their presence would mask the types of information from the sensitive database(s). In many applications, the number of sensitive documents is relatively small. Thus, the ghosting vectors might significantly outnumber the vectors corresponding to sensitive documents.

Further, an alternative to ghosting is dilution. In this case, a significant number of non-sensitive documents are mixed with the sensitive ones by the owner of the sensitive database(s). Once again, the document vectors passed to the shared LSI space would be indistinguishable from one another. At the local level, however, the owner of the shared database could simply ignore the existence of the dilution vectors. Dilution has the advantage over ghosting in that it also can place terms into the space that mask the aggregate term content of the sensitive documents. As in the case of ghosting, the dilution documents could be either picked at random or deliberately chosen to mask characteristics of the sensitive documents. Documents could be chosen (or created) to mask even the vocabulary of the sensitive documents.

When document vectors for sensitive documents are shared, there are, in principle, some pathological documents for which there could be some ability to associate some terms with a given document. Even in these cases, the order of those terms in that document could not be reconstructed. In general, the quantization errors involved in creating the term and document vectors would prevent this from being carried out. Random dithering of the vectors can provide protection against discovering any such linkages. These slight perturbations of term and/or document vectors would have no noticeable effect on query or categorization results. However, they would substantially reduce the possibility of reconstruction, even for pathological documents.

Applications

Aspects of the present invention may be applied to a variety of applications. For example, the aspects of the present invention may be applied to surveillance, information analysis, interdiction, recruitment and the like. Further, aspects of the present application may be applied to the following areas:

Privacy—Government homeland defense initiatives call for analysis of relationships in large databases such as financial transactions, airline reservations, etc. It is desirable to be able to search for relationships of interest in the body of information as a whole, without exposing the details of individual accounts and transactions. In particular, it is desirable to be able to carry out the discovery phase of such investigations in a manner that protects the privacy of individuals.

Intellectual property—The scale and complexity of modern commercial activity increasingly calls for collaborative activities by commercial entities. In many cases, two companies may wish to share information at an overall, aggregate level, but not, in general, at a detailed level. For example, two companies may want to consider possibilities for carrying out joint R&D activities. It is in the best interest of each company to be able to compare their current R&D activities. However, the desire to protect intellectual property rights prevents them from sharing the details of individual projects. It would be beneficial if they could safely explore their mutual areas of interest in some depth, but in a manner that does not expose details of individual programs.

Legal—There are some government activities where there is a conflict generated by the differing purposes of agencies. This is particularly true in the case of counterintelligence (CI). Intelligence gathering activities frequently produce information that may be of value in the conduct of CI investigations. It is in the national interest that the intelligence agencies share such information with the appropriate elements of the Justice Department. However, the goal of the Justice Department is to prosecute the individuals. Rules of law allow subpoena of documents that have been used in developing a given case. This factor makes the intelligence agencies reluctant to share information that has been obtained from sensitive sources. Ideally, it is desirable to be able to make the aggregate implications of information from sensitive sources available to Justice Department personnel, without having to expose the individual source documents.

National security—The problem of homeland defense presents pressing requirements for secure information sharing. The complexity of the terrorism problem calls for an unprecedented degree of information sharing for analytic purposes. However, this must be done in a manner that protects sensitive sources.

These various applications may be implemented using various embodiments of the present invention.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A computer-based method for securely sharing sensitive documents, wherein a non-sensitive vector space is embodied in a computer readable medium, and the non-sensitive vector space includes non-sensitive term vectors and non-sensitive document vectors corresponding to a collection of non-sensitive documents, the computer-based method comprising:
   (a) transmitting a subset of the non-sensitive term vectors to a plurality of entities that each manage a sensitive document database, each non-sensitive term vector corresponding to a non-sensitive term;
   (b) receiving offset vectors from the plurality of entities responsive to sensitive documents in the sensitive document databases that contain the non-sensitive terms;
   (c) updating the term vectors in the non-sensitive vector space responsive to the offset vectors from the sensitive documents, wherein step (c) comprises:
      updating the term vectors in the non-sensitive vector space responsive to the offset vectors, such that a first term vector is updated based on a combination of offset vectors respectively received from each entity, and
      updating the term vectors in the non-sensitive vector space responsive to the offset vectors, such that a new term vector is generated for each offset vector;
   (d) generating a vector representation of a query in the non-sensitive vector space based on the updated term vectors; and
   (e) identifying at least one non-sensitive document based on a comparison between the vector representation of the query and the non-sensitive document vectors.

2. The computer-based method of claim 1, further comprising:
   transmitting a number of times each non-sensitive term occurs in the collection of non-sensitive documents.

3. The computer-based method of claim 1, wherein step (b) further comprises:
   receiving new term vectors from the plurality of entities.

4. The computer-based method of claim 3, wherein step (c) comprises:
   updating the term vectors in the non-sensitive vector space responsive to the offset vectors and the new term vectors.

5. A computer program product comprising a computer readable storage medium having computer readable program code stored therein for securely sharing sensitive information, wherein a non-sensitive vector space is embodied in the computer readable storage medium, and the non-sensitive vector space includes non-sensitive term vectors and non-sensitive document vectors corresponding to a collection of non-sensitive documents, the computer readable program code comprising:
   computer readable first program code for causing a computer to transmit a subset of the non-sensitive term vectors to a plurality of entities that each manage a sensitive document database, each non-sensitive term vector corresponding to a non-sensitive term;
   computer readable second program code for causing a computer to receive offset vectors from the plurality of entities responsive to sensitive documents in the sensitive document databases that contain the non-sensitive terms;
   computer readable third program code for causing a computer to update the term vectors in the non-sensitive vector space responsive to the offset vectors from the sensitive documents, wherein the computer readable third program code comprises:
      code for causing the computer to update the term vectors in the non-sensitive vector space responsive to the offset vectors, such that a first term vector is updated based on a combination of offset vectors respectively received from each of the entities, and
      code for causing the computer to update the term vectors in the non-sensitive vector space responsive to the offset vectors, such that a new term vector is generated for each offset vector;
   computer readable fourth program code for causing a computer to generate a vector representation of a query in the non-sensitive vector space based on the updated term vectors; and
   computer readable fifth Program code for causing a computer to identify at least one non-sensitive document based on a comparison between the vector representation of the query and the non-sensitive document vectors.

6. The computer program product of claim 5, further comprising:
   computer readable sixth program code for causing a computer to transmit a number of times each non-sensitive term occurs in the collection of non-sensitive documents.

7. The computer program product of claim 5, wherein the computer readable second program code further comprises:
   code for causing the computer to receive new term vectors from the plurality of entities.

8. The computer program product of claim 7, wherein the computer readable third program code comprises:
   code for causing the computer to update the term vectors in the non-sensitive vector space responsive to the offset vectors and the new term vectors.

* * * * *

UNITED STATES PATENT AND TRADEMARK OFFICE
CERTIFICATE OF CORRECTION

PATENT NO. : 8,024,344 B2  Page 1 of 1
APPLICATION NO. : 12/133991
DATED : September 20, 2011
INVENTOR(S) : Roger Burrowes Bradford It is certified that error appears in the above-identified patent and that said Letters Patent is hereby corrected as shown below:

Title page, Item (56), Other Publications Section, Line 5, please replace "INformation and Communications Security" with --Information and Communications Security--.

Column 22, line 44, please replace "fifth Program code" with --fifth program code--.

Signed and Sealed this
Tenth Day of January, 2012

David J. Kappos
*Director of the United States Patent and Trademark Office*